(12) United States Patent
Weldon et al.

(10) Patent No.: US 7,702,247 B1
(45) Date of Patent: Apr. 20, 2010

(54) LATENT IMAGE DEVELOPER SYSTEM AND METHOD

(76) Inventors: John Michael Weldon, 21 Highview Cir., Denton, TX (US) 76205-8523; Albert Barsimanto, 1062 Belmarin Keys Blvd., Novato, CA (US) 94949-5335

(*) Notice: Subject to any disclaimer, the term of this patent is extended or adjusted under 35 U.S.C. 154(b) by 1082 days.

(21) Appl. No.: 11/367,133

(22) Filed: Mar. 4, 2006

Related U.S. Application Data

(60) Provisional application No. 60/687,714, filed on Jun. 6, 2005, provisional application No. 60/658,388, filed on Mar. 4, 2005.

(51) Int. Cl.
*G03G 15/20* (2006.01)
*G03B 27/62* (2006.01)
*B42D 15/00* (2006.01)

(52) U.S. Cl. .......................... 399/1; 399/411; 355/76; 283/70

(58) Field of Classification Search .................. 399/1–3, 399/222, 411; 283/70, 72; 355/73, 76
See application file for complete search history.

(56) References Cited

U.S. PATENT DOCUMENTS 5,826,147 A 10/1998 Liu et al.

OTHER PUBLICATIONS

Baier, Peter E. "Application of Experimental Variables to the Use of the Electrostatic Detection Apparatus." Journal of Forensic Sciences (JOFS) 28.4: 901-910. Oct. 1, 1983.*
Noblett, Michael G., and Elizabeth L. James. "Optimum Conditions for Examination of Documents Using an Electrostatic Detection Apparatus (ESDA) Device to Visualize Indented Writings." Journal of Forensic Sciences (JOFS) 28.3. Jul. 1, 1983.*
Riebeling, Ian J., and Hilton J. Kobus. "Some Parameters Affecting the Quality of ESDA Results." Journal of Forensic Sciences (JOFS) 39.1 (1994): 15-20.*
Dan Purdy, "A Method for Determining the Condition of an ESDA or IMEDD", American Society of Questioned Document Examiners meeting, Indianapolis, Indiana, 1998.

* cited by examiner

*Primary Examiner*—David M Gray
*Assistant Examiner*—Gregory H Curran
(74) *Attorney, Agent, or Firm*—Kevin Mark Klughart

(57) ABSTRACT

A latent image developer system and method is disclosed permitting the recovery of document impressions present in paper and other materials. The disclosed system utilizes two power supplies, a first power supply providing a plate bias charge which is applied to the document to be inspected, and a secondary power supply utilized to attract toner or other imaging powder attractant to the latent images present on the document to be inspected. The disclosed invention permits recovery of previously unrecoverable latent detail within documents as compared to the prior art which utilized a single power supply to promote toner to be attracted to the latent document images.

20 Claims, 24 Drawing Sheets

1400

LATENT IMAGE DEVELOPER SYSTEM AND METHOD

CROSS REFERENCE TO RELATED APPLICATIONS

Provisional Patent Applications

Applicants claim benefit pursuant to 35 U.S.C. §119 and hereby incorporate by reference Provisional Patent Application for "LATENT IMAGE DEVELOPER SYSTEM AND METHOD", Ser. No. 60/687,714, filed Jun. 6, 2005.

Applicants claim benefit pursuant to 35 U.S.C. §119 and hereby incorporate by reference Provisional Patent Application for "ENHANCED LATENT IMAGE DEVELOPER E-LID", Ser. No. 60/658,388, filed Mar. 4, 2005.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related to the recovery of latent images present in documents, such as might be generated by handwriting impressions on a tablet, checkbook, or other document, shoeprints recovered from crime scenes, as well as materials which may be associated with explosives detonated by terrorists and the like. These latent images are generally not visible to the naked eye, but may be retrieved via the use of forensic techniques utilizing application of electric charge to the document surface and subsequent application of imaging powder to the document surface to retrieve the latent image impressions.

The present invention improves on the prior art by utilizing a new technique of "document biasing" wherein the document is precharged with a positive electric charge prior to the application of negative charge to the surface of the document. This technique drastically improves the contrast in the recovered latent image and permits finer degrees of detail to be obtained in documents that were heretofore impossible to recover using techniques taught by the prior art.

The present invention is particularly well adapted to forensic analysis by law enforcement agencies and has wide application by law enforcement in countering terrorism, as in many cases the forensic analysis of documents and artifacts recovered from bomb blasts yields fingerprints and/or document impressions that can be directly traced to an individual terrorist or group of terrorists. This information is critical to the identification and apprehension of terrorists and other criminals and such the present invention materially contributes to counter-terrorist efforts by law enforcement and other governmental agencies tasked to thwart terrorist efforts.

PRIOR ART AND BACKGROUND OF THE INVENTION

Overview (0100, 0200)

The prior art with respect to the present invention is generally illustrated in FIG. 1 (0100) and FIG. 2 (0200), wherein the problem of retrieving latent images from a test document is the general problem addressed by the prior art.

Referencing FIG. 1 (0100) from U.S. Pat. No. 5,826,147 (issued to Chu-heng Liu and Weizhong Zhao for ELECTROSTATIC LATENT IMAGE DEVELOPMENT on Oct. 20, 1998), the general approach to latent image retrieval from documents using the prior art involves the application of a positive or negative charge (60) to the surface of a document and subsequent application of an imaging powder to retrieve the latent document image. Minor indentations in the document surface are raised and may subsequently be viewed using this technique.

FIG. 2 (0200) illustrates this principle generally. The prior art teaches that the document to be tested (0210) is placed on a platen (0201), with subsequent application of a charge (0202) via a document wand (0203) moved across (0204) the surface of the document (0210). After the charge is applied to the document surface, application of an imaging powder reveals the latent document image.

Problems Associated with the Prior Art

The prior art suffers from several drawbacks, notably large weight and lack of portability, poor image retrieval quality, poor contrast, susceptibility to environmental conditions (such as temperature, humidity, etc.) and wide variations in results caused by condition of the document being tested. The prior art has yet to address these deficiencies, despite the wide use of this technology in forensic crime scene investigations, at the local, state, national, and international level. Given that document analysis is critical to many law enforcement activities surrounding terrorism, theft, counterfeiting, and other illegal activities, these deficiencies in the prior art have great practical significance but as yet have yet to be addressed in the field of this invention.

OBJECTIVES OF THE INVENTION

Accordingly, the objectives of the present invention are (among others) to circumvent the deficiencies in the prior art and affect the following objectives:

(1) To provide a latent image retrieval system for documents with high contrast definition.
(2) To permit a latent image retrieval system capable of better image retrieval performance than that possible with the prior art.
(3) To permit a latent image retrieval system that may be adapted to a wide variety of environment conditions such as changing humidity and temperature.
(4) To permit a latent image retrieval system that may be easily adapted to a wide variety of document conditions.
(5) To permit a latent image retrieval system that is lightweight and portable.

(6) To permit improved latent images to be retrieved from crime scenes involving acts of terrorism such as bomb explosions and the like for the express purpose of identifying and capturing terrorists.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Functional Overview (0300)

The present invention as generally illustrated in FIG. 3 (0300) and will now be generally described as to function.

The present invention (0300) incorporates the use of a conductive platen (0301) mated to a vacuum box (0302). Exemplary embodiments of the present invention generally incorporate a sintered conductive platen (0301) used in conjunction with a vacuum generator pump (0303) to permit fixation of the test document (0310) to the conductive platen (0301) during the latent image retrieval process.

The present invention incorporates a positive charge generator (0304) in conjunction with an activation mechanism (0314). This permits a positive background charge ("charge bias") to be applied to the test document (0310) which has typically been covered with a protective insulating film (0311) such as MYLAR® brand polyester film or polyvinyl. This background charge is applied using the control (0314) and then allowed to bleed off the test document (0310), thus permitting a charge distribution on the test document (0310) to align to the latent image.

The positive charge (which is typically 7000 volts but may be controllable and variable in nature), charges the platen plate and conditions the plate side of the film covering the document to be processed. This active process is an advance over existing passive document charging systems. The positive charge generator typically has its own on/off switch (0314) or other control means.

Once the positive charge has been allowed to affix to the document, a negative charge (0305) is activated (0315) and applied to a document wand (0306). The document wand (0306) generally contains one or more ionization points (0307) which spray charge from the wand to the surface of the document.

The document wand (0306) typically provides a variable negative output ranging from 7000 volts to 14000 volts, so that an operator has the flexibility to evenly saturate the surface of the film barrier covering the document. The result is a more uniform charge across the surface of the document.

The protective film barrier is a non-conductive (dielectric) insulator that can be charged on either side with opposing polarities. A significant advantage of the present invention is that this protective film (and the associated document) are charged on both sides by the disclosed process, producing a significant advantage as compared to the prior art.

System Overview (0400)

A typical exemplary system embodiment of the present invention is illustrated in FIG. 4 (0400), wherein the system generally comprises the document platen (0401) on which the test document is placed, the document wand (0402) used to spray negative charge on the insulating document cover, the charge generator (0403) which provides positive and negative charge for both the document platen (0401) and the document wand (0402), and the vacuum generator pump (0404) (shown separately but which may be integrally incorporated in the document platen (0401) in some preferred embodiments.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
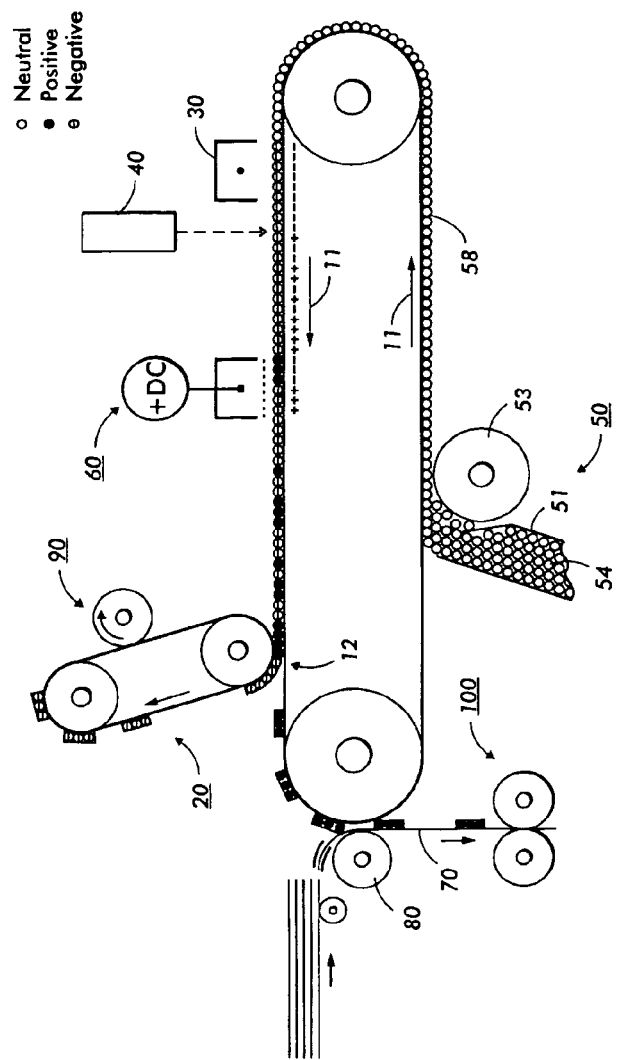
FIG. 1 illustrates a prior art embodiment of a document latent image recovery system (as disclosed in U.S. Pat. No. 5,826,147 issued to Chu-heng Liu and Weizhong Zhao for ELECTROSTATIC LATENT IMAGE DEVELOPMENT on Oct. 20, 1998)
Figure 2:
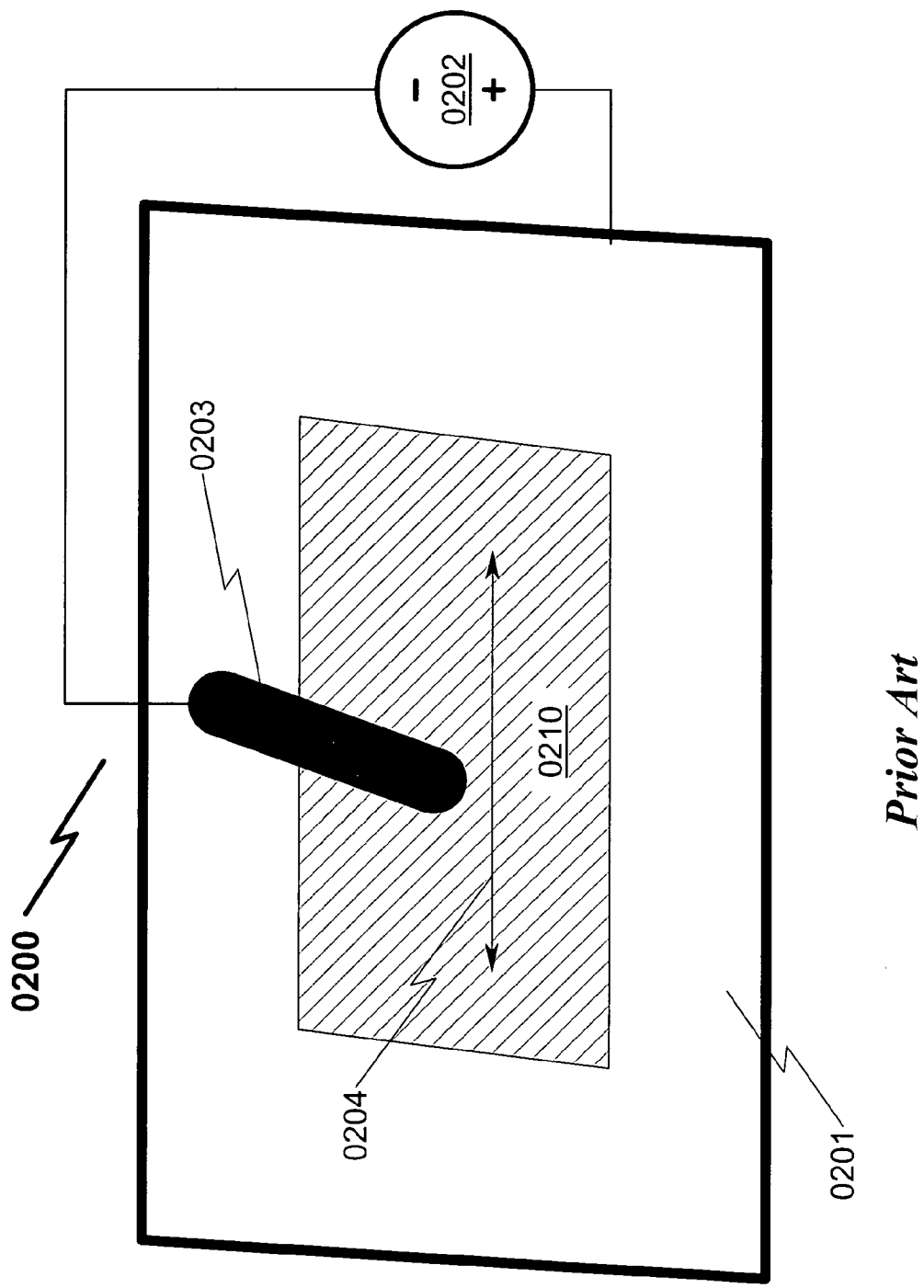
FIG. 2 illustrates a generalized prior art structure of how document latent images are recovered using negative charge fixing to the document.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a LATENT IMAGE DEVELOPER SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Overview

The present invention embodies the construction of an improved system and method for revealing latent written messages, multiple messages, images, and/or notes of original writing and drawings on the underlying pages of a pad, notebook, or other surfaces that can be indented. In addition, fingerprints can sometimes be developed if recently applied.

When writing a message on a pad of paper the blank pages underneath can be "indented" like an "invisible" copy.

In the making of an "original document," it is quite common to leave an "indented" copy or multiple indented copies on the pages of a writing pad or on a magazine or newspaper or on another original document.

Very often indented surfaces may contain "latent images" which, if revealed clearly, could produce valuable evidence in the course of an investigation for whatever reason, including possible suspected criminal activities, or for indications of suspected alteration or substitution (as in forgery, etc.).

The present invention is an improvement over prior art latent image recovery systems utilizing electrostatic technology to develop latent images. The basic elements and construction used in prior art latent image recovery systems include the following elements and/or steps:

A metal enclosure encompassing a porous metal plate that pulls a light vacuum so that a document placed on the surface is held tight to the surface;

A thin clear non-conductive plastic film is placed over the document and is also held tightly to the surface due to the vacuum. The top surface of the film is electrically charged using a portable tungsten wire electrode raised to a potential of approximately 7000 volts either with a positive or negative polarity.

A carbon toner is then applied to the charged film surface to reveal indentations on the surface of the document. The film holds the image and protects the document from any contact with the carbon toner.

The metal plate may be connected to a line ground to improve the attraction of the static charge on the film to the document.

The present invention teaches that a dielectric media (film or document) may be charged on opposite surfaces with opposite polarities and that the field attraction is greatly enhanced using this technique. Thus, an imaging technique using this principle can produce greatly enhanced performance over that of the prior art. The laws of physics dictate that opposite charges attract, and that both positive and negative charges are attracted to earth ground. The present invention relies on the fact that the forces of attraction between opposite charge polarities are substantially greater than that between either charge polarity and earth ground.

The present invention provides the following features:

A positive charge is applied to the platen plate of approximately 6000 volts (which may be varied if necessary). This charge can be independently controlled via the use of a control switch and may have its status optionally indicated via the use of an indicator light.

The separately operated negative charge output voltage is controlled by a variable potentiometer (or other control mechanism) from 6000 volts to 14000 volts encased in a special document wand. The strength of the applied charge can also be varied via modulating the distance between the document wand and the document surface.

The document wand in this configuration exposes no high voltage wire, but rather consists of one or more needle point electrodes above each of which is a flat disc that deflects the charge downward in a spray-type fashion which assures an even charge distribution over the entire surface of the insulating film covering the document to be tested.

One skilled in the art will recognize that ambient conditions can affect the image developing process. Temperature, humidity, and other variables exist from location to location. High humidity may require an increase in the applied charge voltages used to process a given document.

The operator of the present invention may develop a variety of techniques to enhance the development of the image retrieval process. The present invention provides new flexibility which may provide the reworking of a section of a document. Increasing or decreasing the independent charge voltages to account for changes in ambient conditions provides greater flexibility and the ability to retrieve previously undetectable latent images in most application environments.

Charge Generator Voltages

Figure 3:
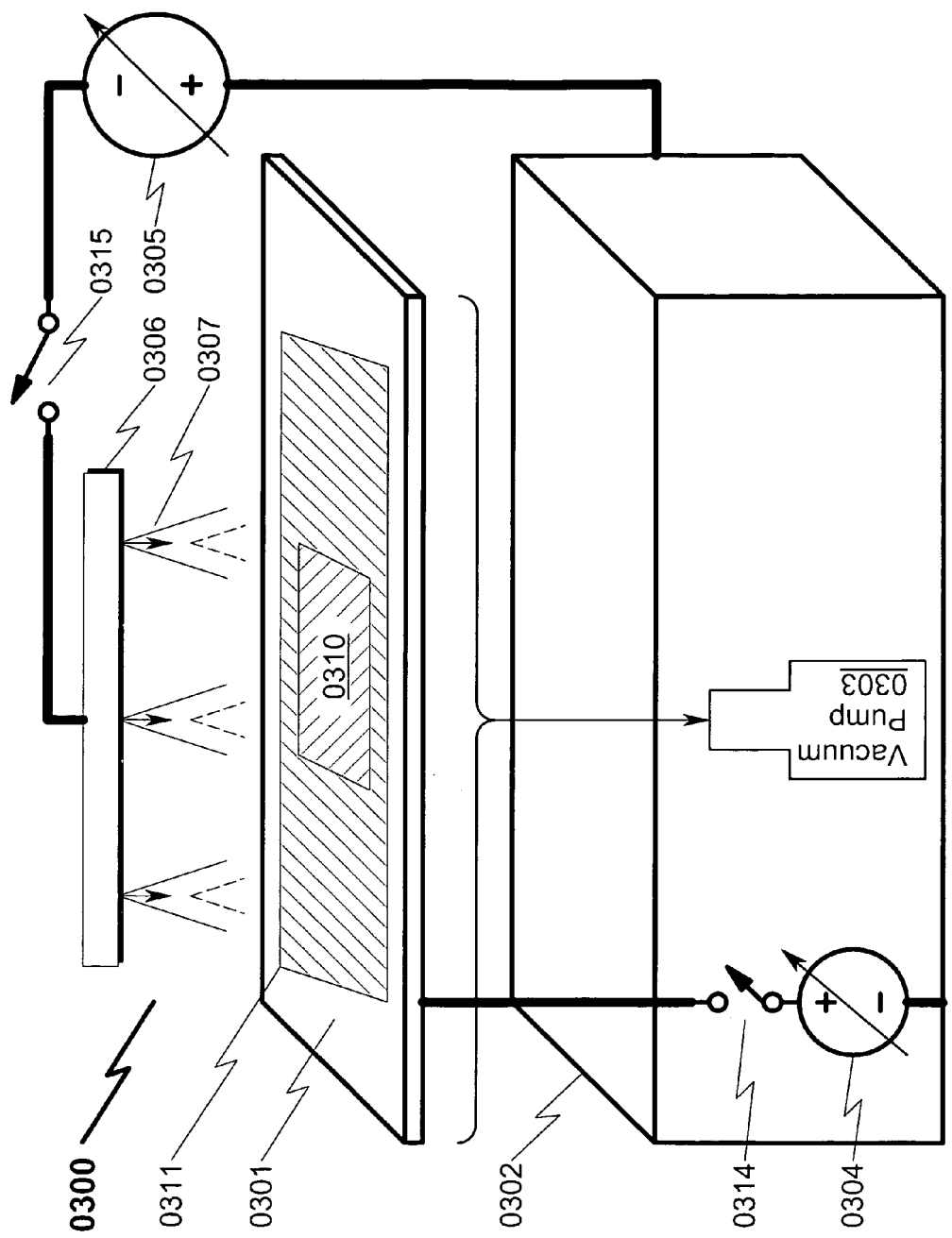
FIG. 3 illustrates a generalized preferred exemplary embodiment of the present invention.

As generally illustrated in FIG. 3 (0300), the present invention makes use of a positive charge generator (0304) and a negative charge generator (0305), which in some preferred embodiments are fully adjustable as to their potential voltage. However, it is notable that some preferred embodiments may use positive and/or negative charge generators that operate with fixed voltages.

Document Preparation—Humidification

In some preferred embodiments the present invention makes use of a hygrometer capable of measuring the moisture content (humidity content) of the paper being evaluated for latent document images. It has been found by experimentation that in many circumstances the latent image may be enhanced by first performing a test of the moisture content of the document to be tested with a humidification test device. One skilled in the art will recognize that a variety of these types of devices are commercially available. Once non-destructive testing of the document humidity has been performed, the document is optionally humidified to obtain a humidity content of less than approximately 20% relative humidity.

While it has been found that in many situations this optional document humidification results in better latent document image development, this in no way limits the scope of the present invention, and other experimentation or document conditions may dictate a different target moisture content for optimal results. One skilled in the art will easily be able to extend the teachings of the present invention to encompass these other document specific requirements.

Exemplary Embodiment (0300, 0400)

The present invention is generally illustrated in FIG. 3 (0300), wherein the document to be tested (0310) is placed on a conductive platen (0301) which is mated to a vacuum box (0302). The conductive platen is preferably porous, permitting a vacuum pump (0303) to apply a vacuum to the platen surface, thus affixing the test document (0310) to the surface of the platen (0301).

The present invention incorporates a platen precharge system incorporating a charging source (0304) in conjunction with a control (0314) in the form of a switch or other control mechanism. This precharge source permits the platen and document to be precharged to place a background charge on any insulating protective cover that covers the document being tested. While the insulating protective cover is not shown in FIG. 3, a wide variety of materials are known in the art which are suitable for this use, MYLAR® brand polyester film and polyvinyl being two that are used extensively in latent image recovery. Once the precharge (0304) is applied, it is disengaged (0314) and a time period of typically 15 seconds is allowed to elapse to permit charge transport to the insulating protective cover.

After this time delay, the document wand (0306) is charged with a negative charge source (0305) under control of a switch (0315) or other control means. This document wand generally incorporates ionization emitters (0307) which spray charge to the surface of the protective insulating cover to recover latent image detail from the underlying document (0310).

The present invention permits variation of the baseplate charge (0304) and document wand charge (0305) in some embodiments to permit finer adjustment of the "brightness" and "contrast" associated with the latent image recovery process. These independent controls are adjustments not possible given the teachings of the prior art.

One skilled in the art will recognize that the charge control switches (0314, 0315) may be replaced with any number of control mechanisms (including timers, other electronic switches, and/or computer controls) without loss of generality in the teachings of the present invention.

Additionally, the use of indicator lights within the context of this invention is preferred in many embodiments, but not necessarily essential to the proper operation or functioning of the invention.

Figure 4:
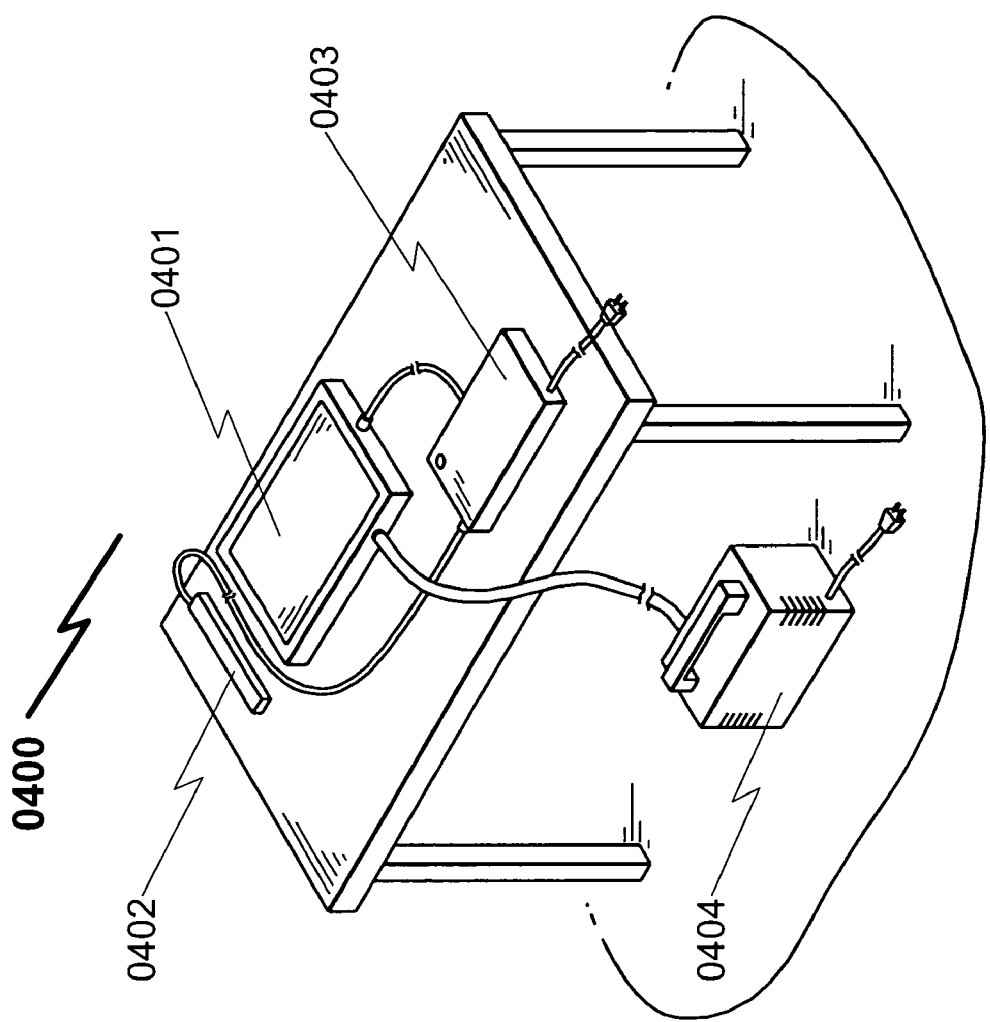
FIG. 4 illustrates a preferred exemplary system embodiment of the present invention.
Figure 5:
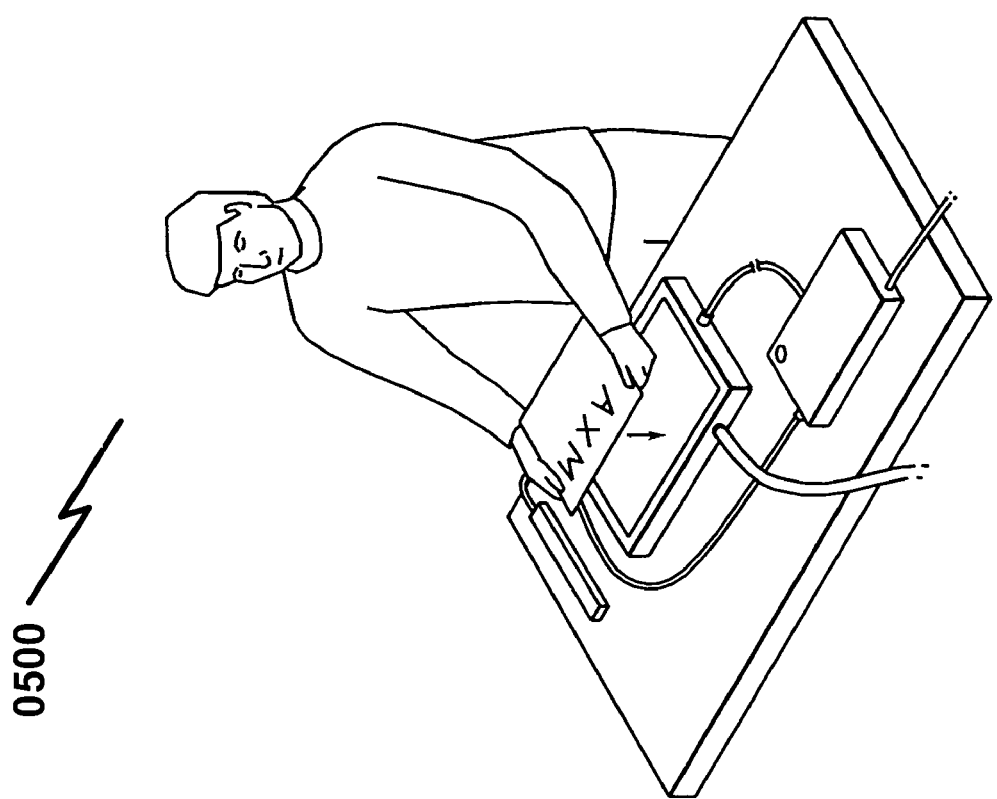
FIG. 5 illustrates an exemplary embodiment of the present invention, showing how the test document is placed on the document plate for latent image analysis.
Figure 6:
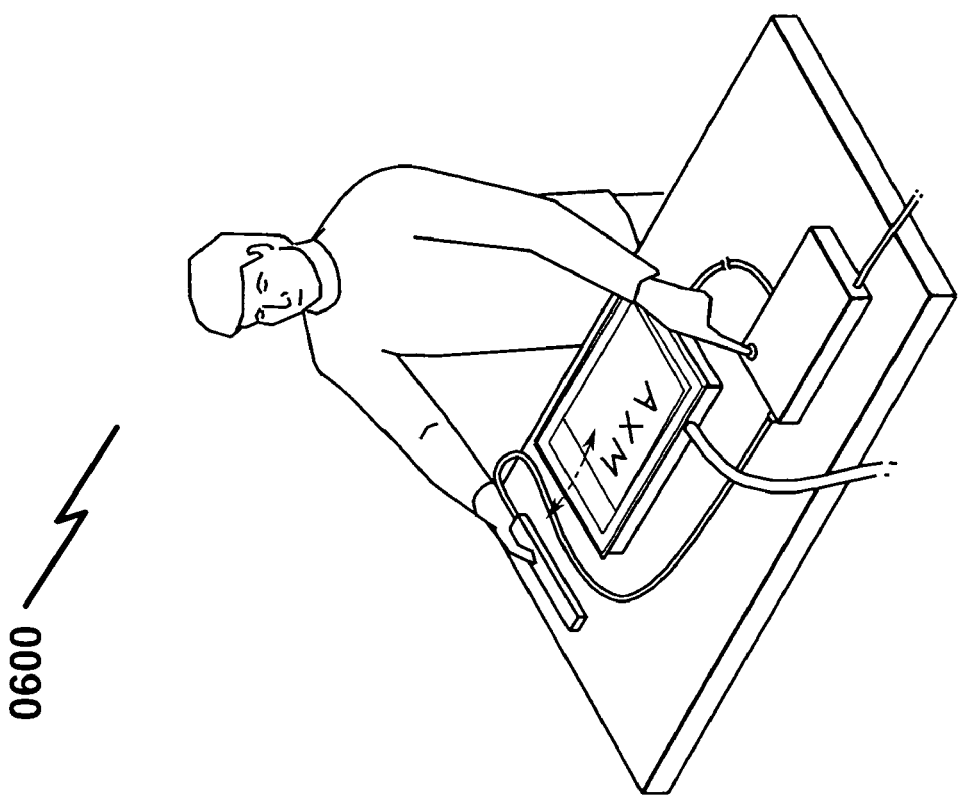
FIG. 6 illustrates an exemplary embodiment of the present invention, showing how the document platen may be used to precharge the test document prior to further processing to retrieve latent images.
Figure 7:
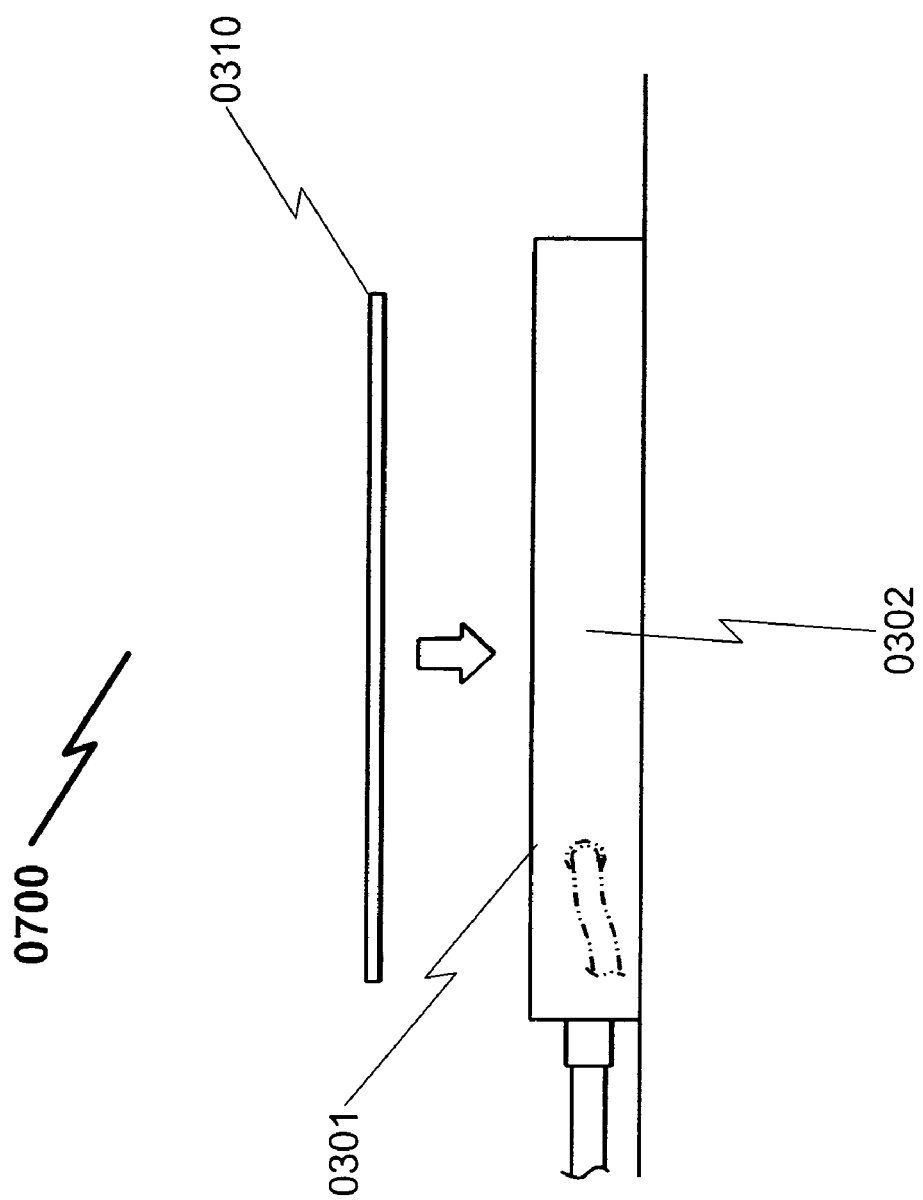
FIG. 7 illustrates a side view of an exemplary preferred embodiment of the present invention, detailing the placement of the test document on the document platen.
Figure 8:
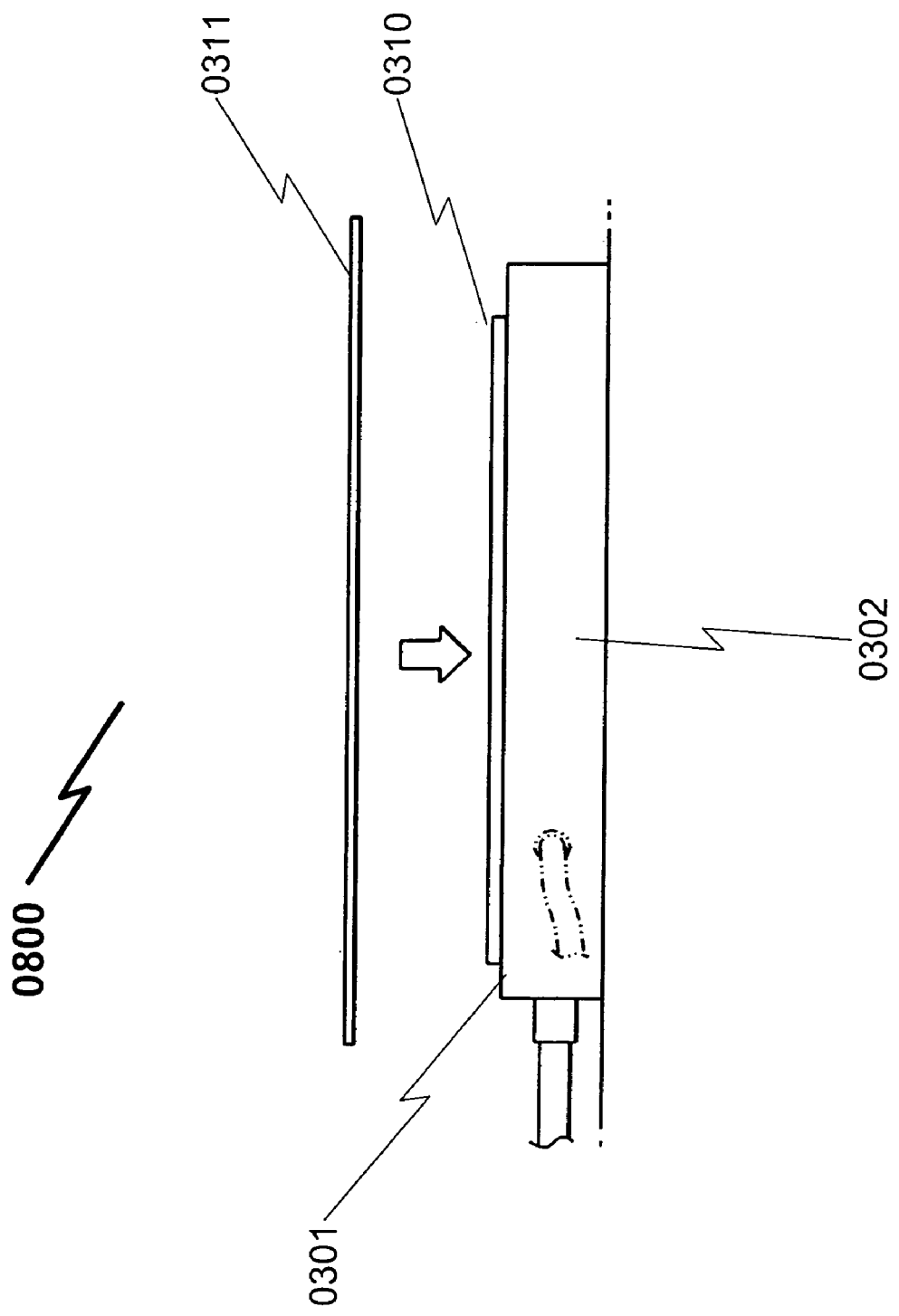
FIG. 8 illustrates a side view of an exemplary preferred embodiment of the present invention, detailing the placement of the insulating protective film over the test document on the document platen.
Figure 9:
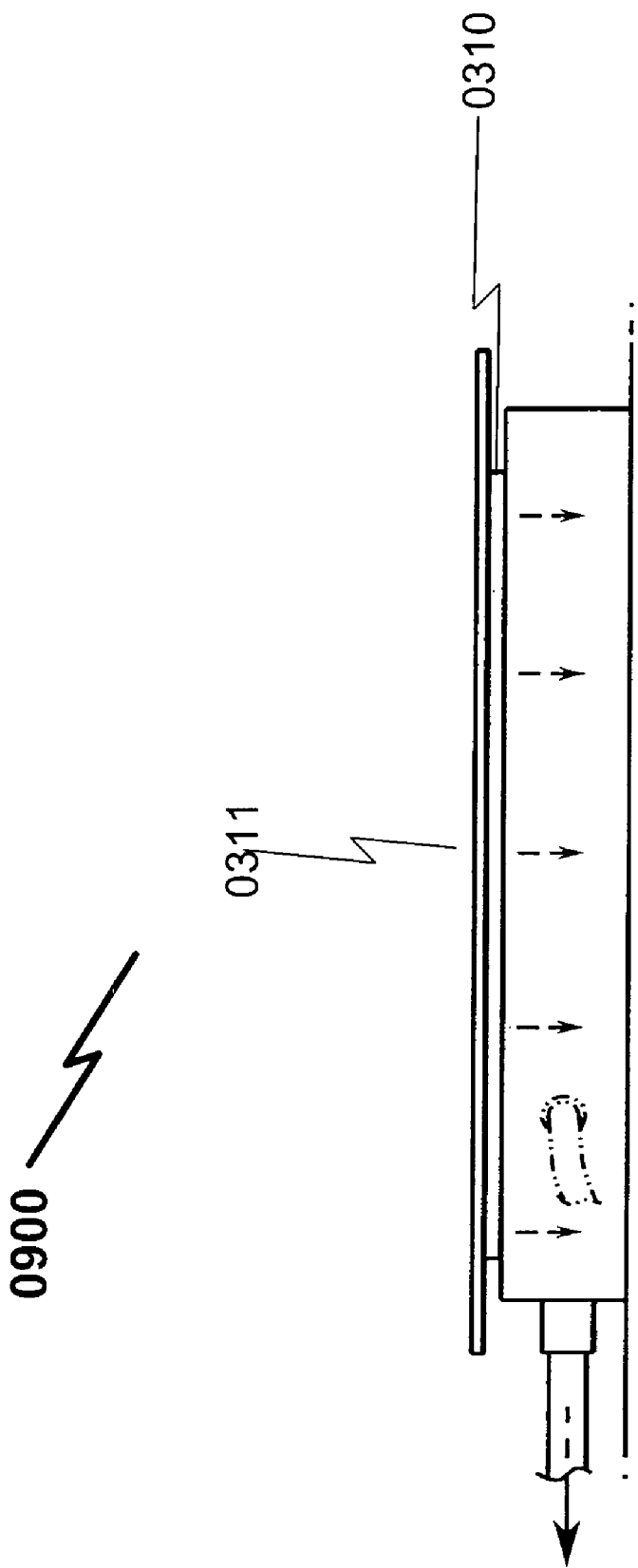
FIG. 9 illustrates a side assembly view of an exemplary preferred embodiment of the present invention, detailing the position of the insulating protective film and the test document on the document platen prior to document latent image recovery.
Figure 10:
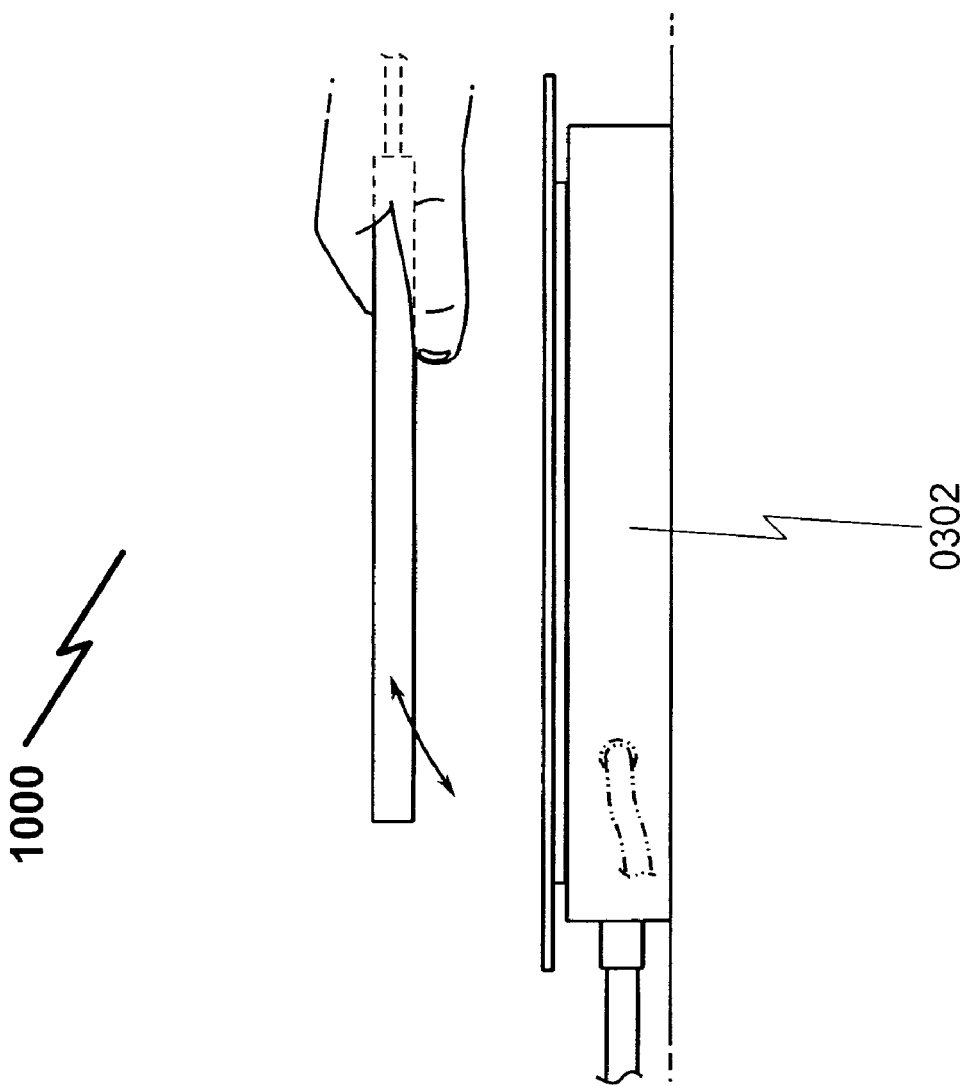
FIG. 10 illustrates an exemplary embodiment of the present invention, showing how the developing wand may be used to charge latent images within a test document and draw these latent images to the covering protective film.

The present invention may be embodied in the exemplary system embodiment illustrated in FIG. 4 (0400) wherein the system comprises a document platen (0401), document wand (0402), charge generator (0403), and vacuum generator pump (0404) (which may be incorporated into the document platen (0401) in some preferred embodiments).

Platen Characteristics

The present invention may incorporate a wide variety of materials for the construction of the platen (0301). However, the general characteristics of the platen are that it is conductive, and preferably porous. Suitable materials for this element of the invention vary widely, but several preferred embodiments utilize sintered aluminum for the platen, providing good electrical conductivity as well as adhesion of the document to the surface when the vacuum is applied.

Protective Film

The present invention may incorporate a protective film over the document during the latent image development process. A wide variety of materials are suitable for this purpose, although many preferred embodiments will utilize MYLAR®, brand polyester film or polyvinyl. Many insulating films known to those skilled in the art will be suitable for this application.

Imaging Powder

Figure 11:
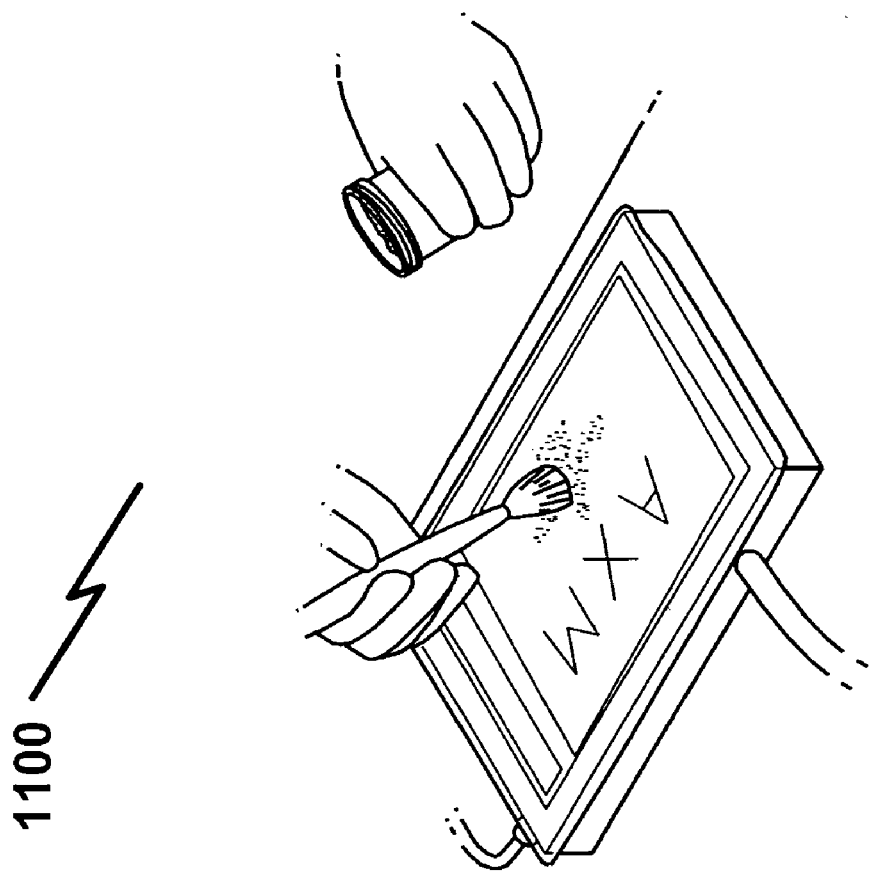
FIG. 11 illustrates an exemplary application of imaging powder to the insulating film covering the test document processed by an exemplary embodiment of the present invention.

The present invention may incorporate a wide variety of substances used as "imaging powder" (generally illustrated in FIG. 11 (1100)) to detect and lift the latent image from the underlying document as it is charged. While many types of imaging powder may be used in this context, several preferred embodiments of the present invention utilize xerographic copier toner for this purpose.

Moisture Meters

The present invention may incorporate the use of a moisture meter (or hygrometer) to test for humidity in the document during latent image recovery. While one skilled in the art will recognize that a wide variety of such meters may be utilized in this application, some preferred embodiments make use of moisture meters from Lignomat USA LTD, 14345 NE Morris Court, Portland, Oreg. 97230 (www.lignomat.com), with preferred embodiments making used of pinless moisture meters from this manufacturer.

Static Meters

The present invention may incorporate the use of a static meter to test for uniform positive charge on the document surface during latent image recovery. While one skilled in the art will recognize that a wide variety of such meters may be utilized in this application, some preferred embodiments make use of a model ACK 300B static meter (ACL 300B Precision Static Locator, manufactured by ACL Staticide, 1960 East Devon Avenue, Elk Grove Village, Ill., 60007, www.aclstaticide.com) for optimal system/method performance.

Fixation Means

Figure 12:
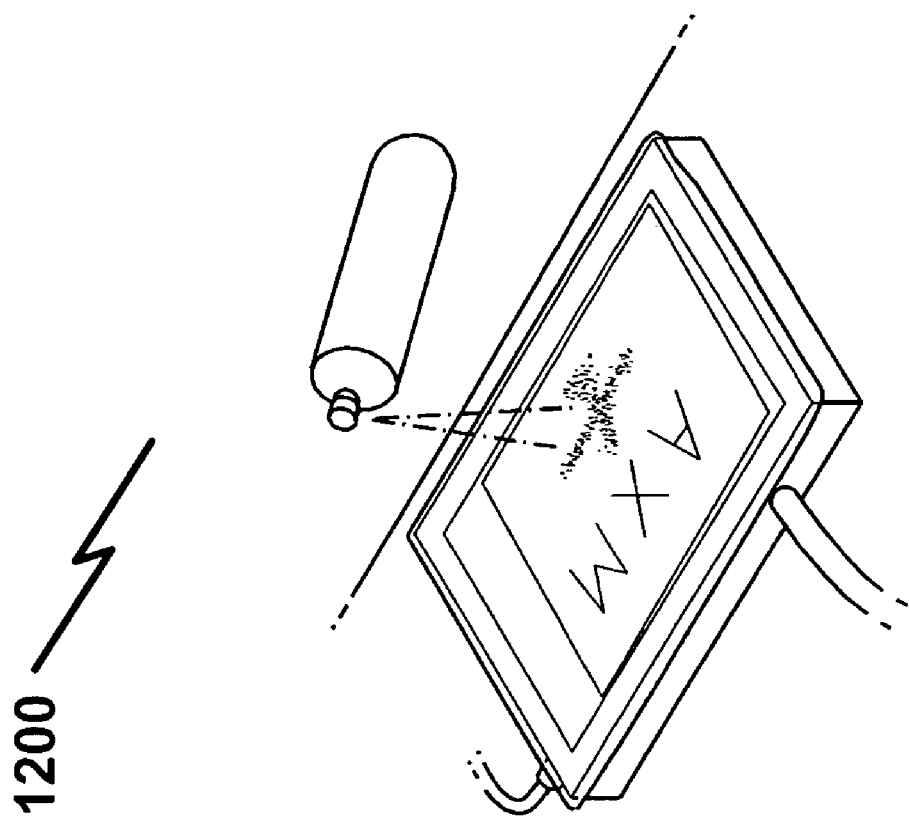
FIG. 12 illustrates an exemplary fixation of a latent image recovered from a test document using an aerosol adhesive applied to the insulating film covering the test document.
Figure 13:
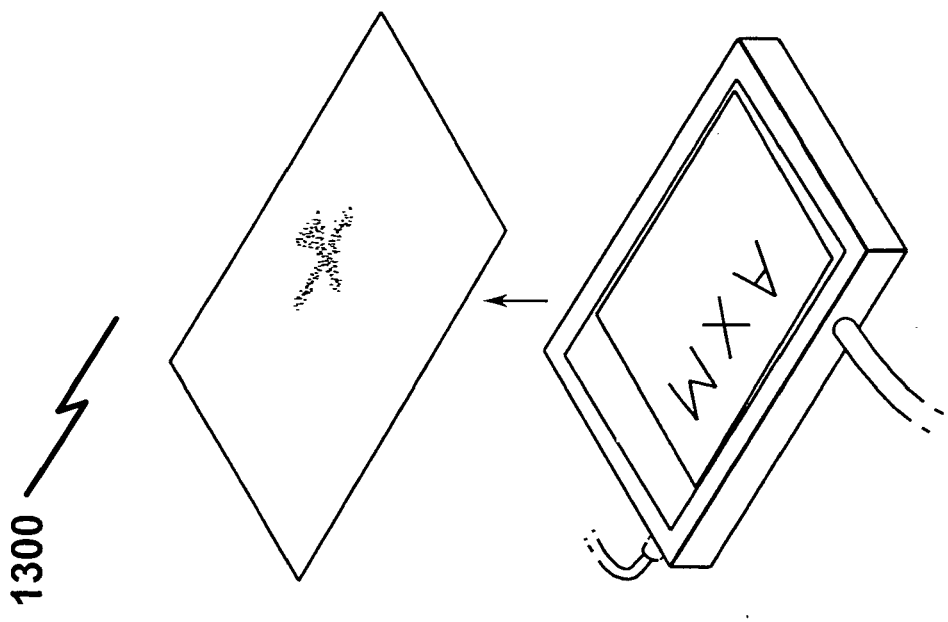
FIG. 13 illustrates removal of the insulating film containing an exemplary latent image recovered from a test document.

The present invention may incorporate a fixation means to "fix" the developed image to the MYLAR® brand polyester film or other insulating protective film. This fixation means may incorporate a wide variety of mechanisms, including but not limited to aerosol adhesive sprays (as generally illustrated in FIG. 12 (1200)), adhesive membranes, clear photographic adhesive sheets, tape, or other systems which are well known to one skilled in the art. The term "adhesive" used in this context should be read to include all such fixation means.

Alternatively, the developed latent image can be recorded using any standard photographic means such a digital camera, etc. This method permits transmission and permanent recordation of the latent image for further forensic analysis.

Calibration System (1400, 1500, 1600)

Figure 14:
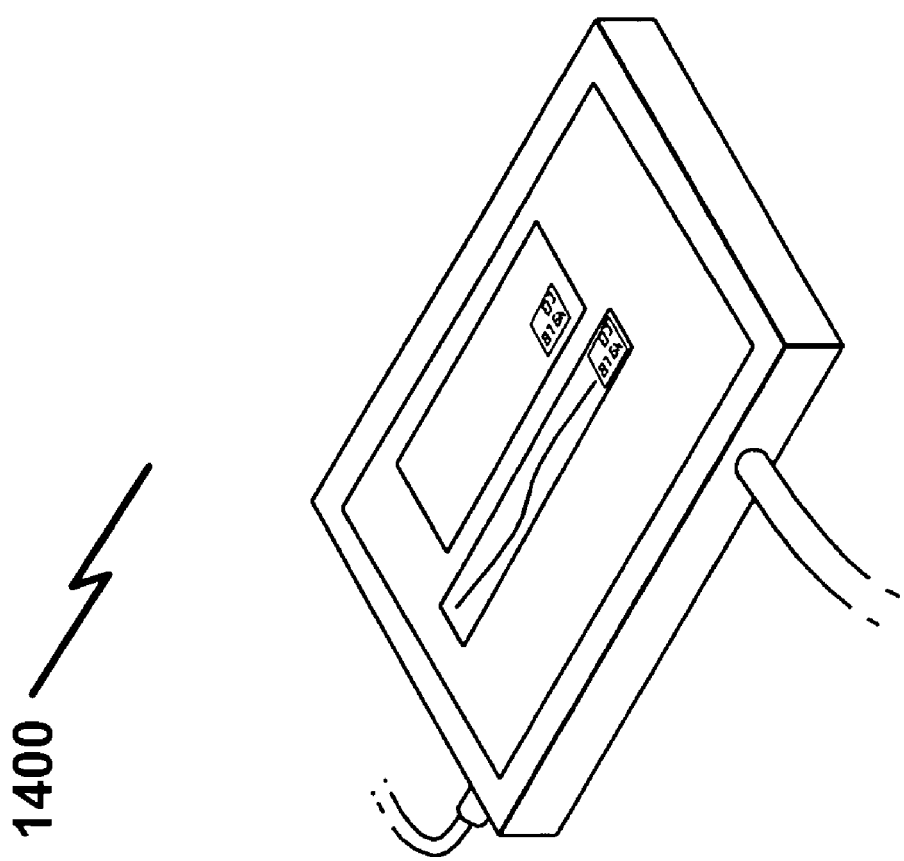
FIG. 14 illustrates use of calibration strips to adjust the operation of the present invention in response to varying document characteristics and ambient test conditions.
Figure 15:
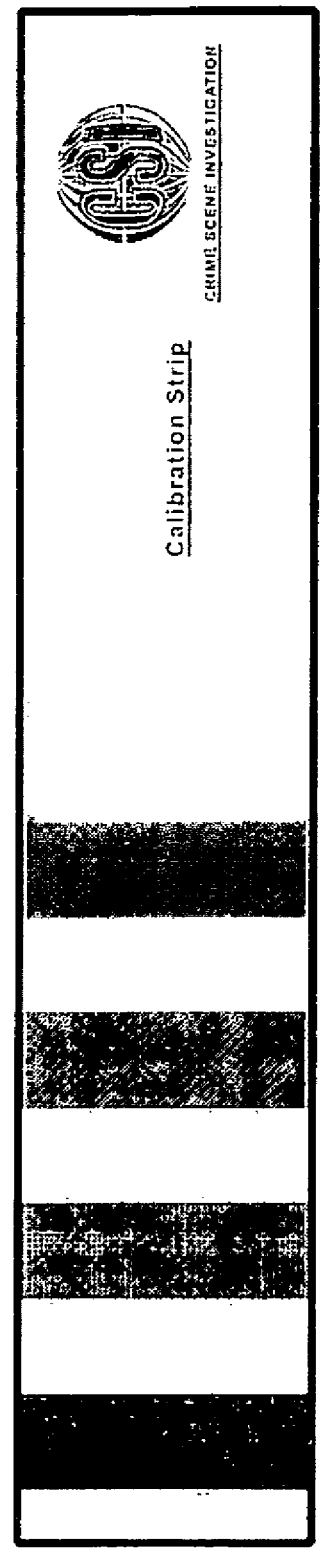
FIG. 15 illustrates the format of an exemplary calibration test strip useful in some preferred embodiments of the present invention.

The present invention may utilize a calibration system in which calibration strips are placed on the document platen as generally illustrated in FIG. 14 (1400) for the purposes of testing the latent image recovery system with a variety of known and calibrated impressions that may be made on a calibration strip (as illustrated in FIG. 15 (1500)).

Figure 16:
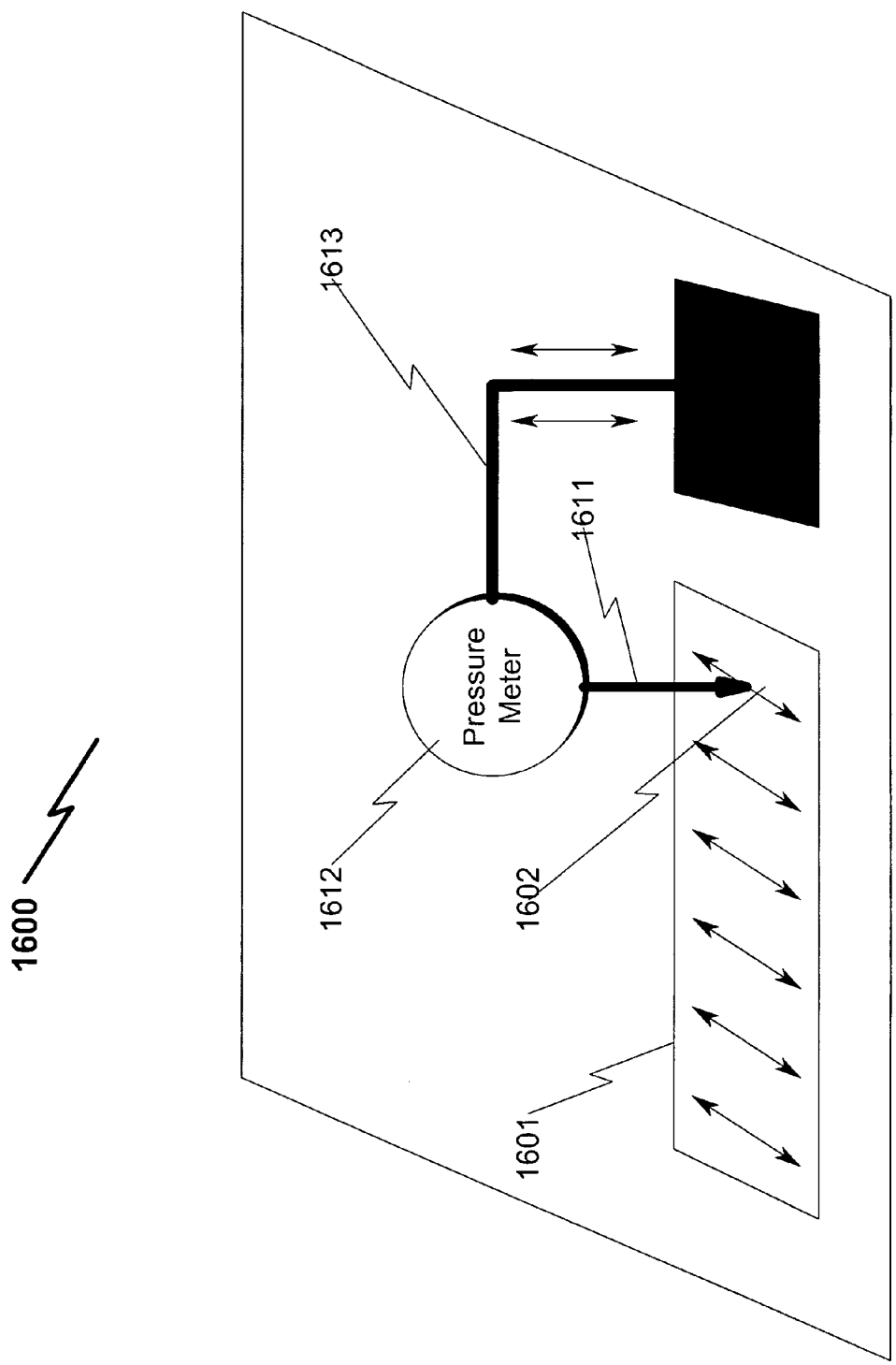
FIG. 16 illustrates an exemplary system useful in manufacturing calibration strips for use with the present invention.

These calibration strips (1500) may take a variety of forms, but generally comprise a variety of paper types and thicknesses with marked areas having impressions made using known marking pressures. A generalized system which may be used to generate these calibration strips is illustrated in FIG. 16 (1600). Here the calibration strip (1601) is marked with impressions (1601) made by a roller ball pen or other device (1611) which is connected to a pressure meter (1612) that is fixed to an adjustable platform support (1613). The adjustable platform support (1613) permits the marking device (1611) to be moved across the calibration strip (1601) with a known impression pressure. Once an impression is generated, the impression pressure can be adjusted and another impression is generated with yet another pressure. This process is repeated until the calibration strip is marked with a number of known impression pressures that can then be used to calibrate the sensitivity of the invention.

As an alternative to the above methodology of creating calibration strips for the present invention, the use of GRADIENT® brand test strips available from the American Society of Questioned Document Examiners, PO Box 18298, Long Beach, Calif. 90807, tel 562-901-3378 may be suitable in many instances.

Exemplary Performance Comparison (1700, 1800, 1900)

Figure 17:
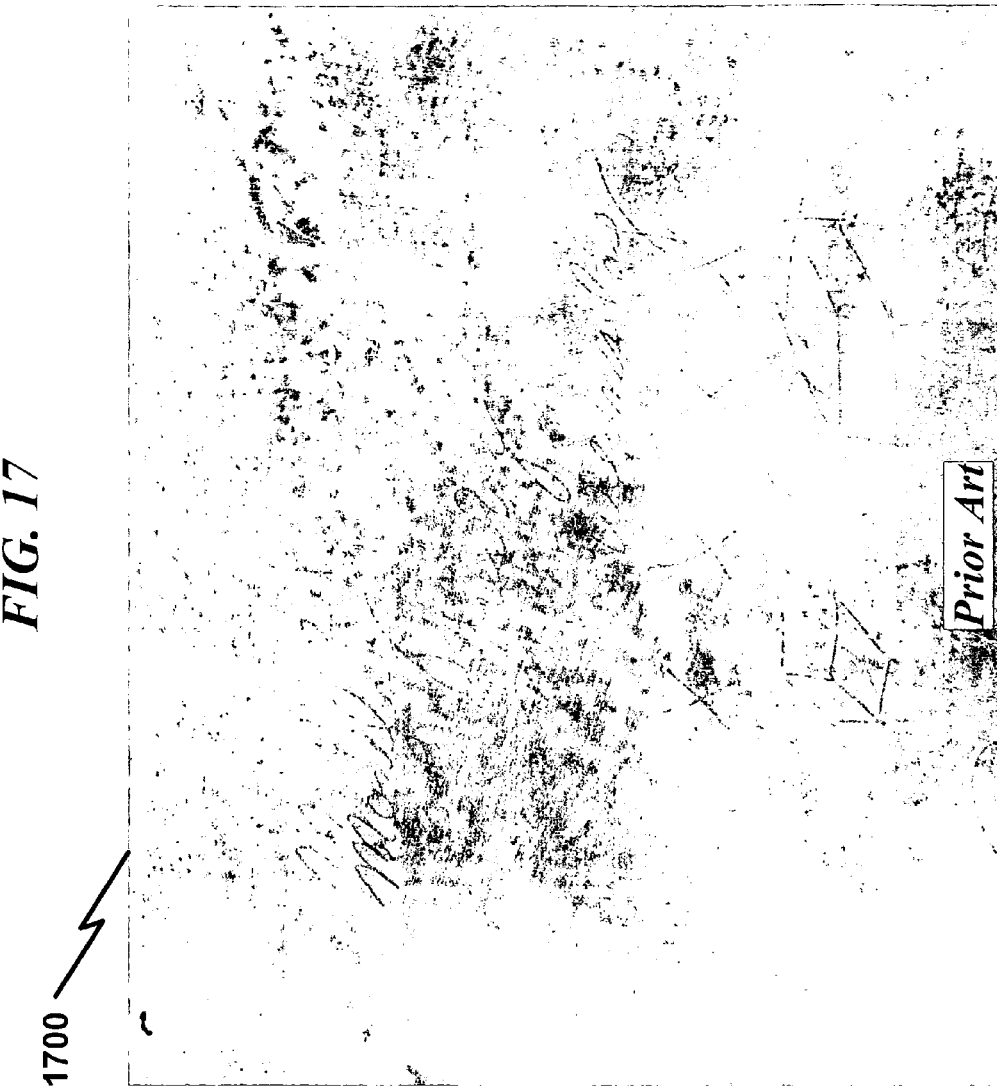
FIG. 17 illustrates a comparison prior art example of latent image recovery from a document.
Figure 18:
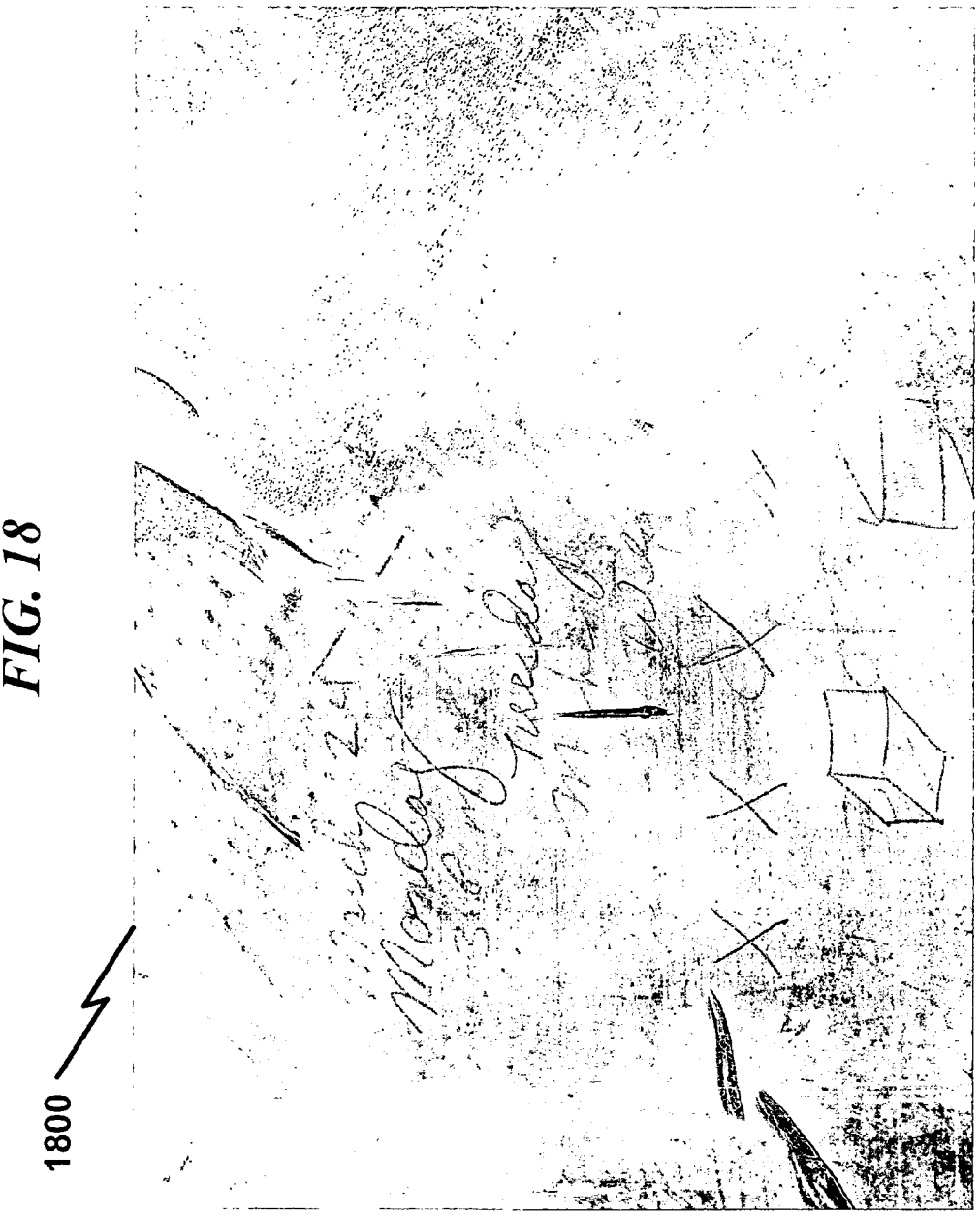
FIG. 18 illustrates an exemplary performance comparison of the present invention as applied to the document illustrated in FIG. 17, illustrating enhanced recovery detail.
Figure 19:
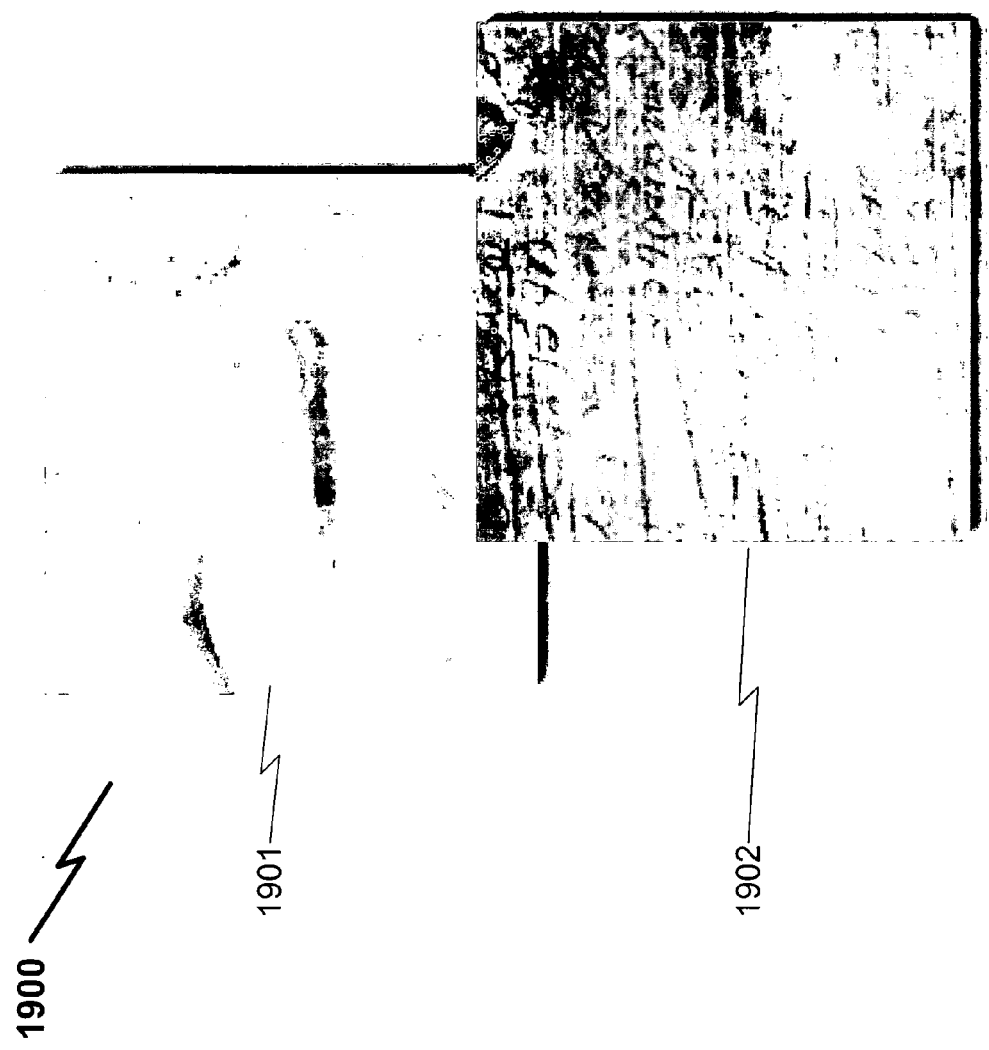
FIG. 19 illustrates exemplary performance comparisons of prior art image recovery systems (as compared to the performance available from the present invention.

The present invention advantages over the prior art may be easily discerned by inspection of the latent image retrieval performance of the prior art in FIG. 17 (1700) as compared to processing of the identical document by the present invention as illustrated in FIG. 18 (1800). Additional comparative illustrations are provided in FIG. 19 (1900), contrasting the prior art performance (1901) with that obtained by the present invention system/method (1902). These comparisons clearly indicate that the ability of the present invention to retrieve detail within the document is far superior to that of the prior art.

Transportation Options (2000)

Figure 20:
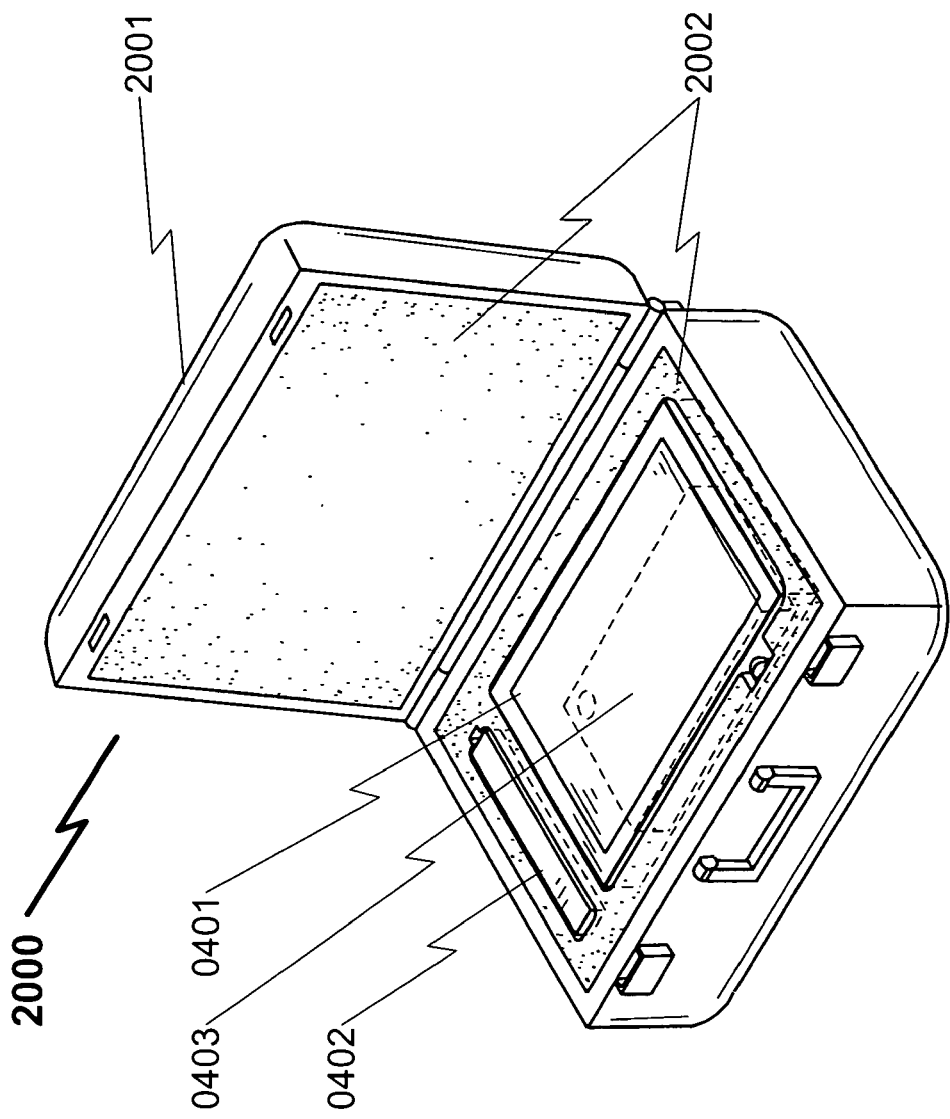
FIG. 20 illustrates an exemplary transportation methodology useful in transporting some preferred embodiments of the present invention.
Figure 21:
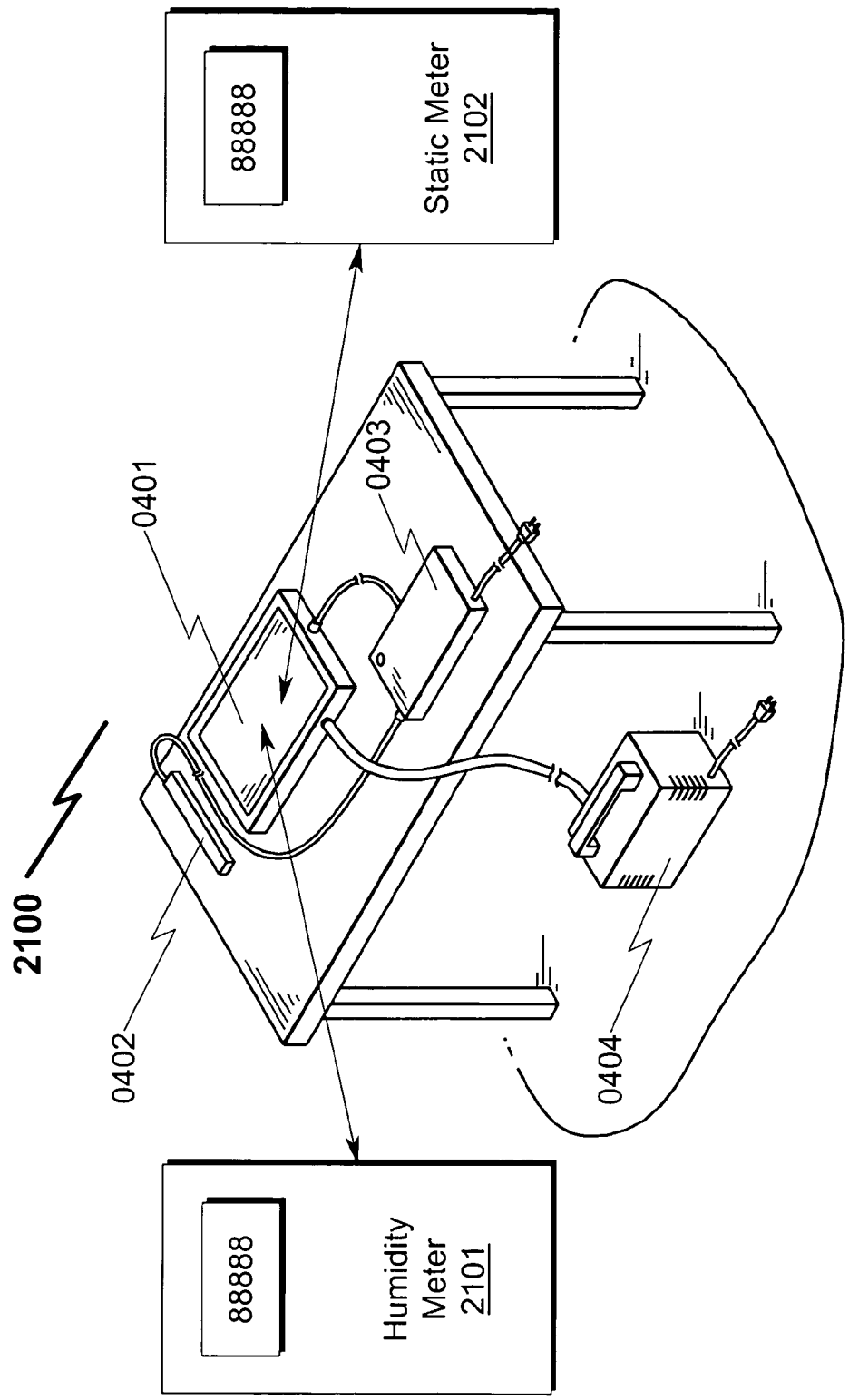
FIG. 21 illustrates an exemplary system embodiment utilizing humidity/moisture and/or static meters to test document moisture content and/or static charge distribution on the insulating film.

One significant advantage of the present invention is the potential for the system to be easily transported to crime scenes for on-site document analysis and latent image development. To this end, the general system embodiment illustrated in FIG. 4 (0400) is amenable to transportation via a commercial carrying case (2001) as illustrated in FIG. 20 (2000), wherein the system components (platen (0401), wand (0402), and charge generator (0403)) can be secured within foam inserts (2002) within a carrying case (2001). While many such commercial carrying cases exist, several preferred embodiments of the present invention utilize PELICAN® brand airline-legal carry-on cases for this purpose.

The high degree of portability associated with the present invention permits it to be transported via traditional commercial airlines and brought on-site to many crime scenes or other locales which were not possible using the bulky apparatus associated with the prior art. Note that the vacuum generator (FIG. 4 (0404)) may either be incorporated into the document platen (0401), or may be transported as a separate unit such as vacuum pressure stations available commercially from manufacturers such as the Barnant Company (www.barnant.com).

System Variations

The present invention anticipates a wide variety of variations in the basic theme of construction. The examples presented previously do not represent the entire scope of possible usages. They are meant to cite a few of the almost limitless possibilities.

Vacuum Box

The present invention specifically anticipates a vacuum box operating housing constructed of non-conductive materials, including the vacuum chamber. This selection reduces or eliminates the potential for electrostatic discharge that could affect the image development process, and also permits boosting the safety and comfort of the operator. This material housing selection also permits storage capacity for supplies.

Portability

The compact nature of the present invention lends itself well to portable environments in which the unit must be transported via airplane or positioned on a wheeled base for easy transport.

Charge Application

The present invention anticipates the possibility for wide variations in the charge application potential to either side of the document under test permits the possibility for great flexibility in application and implementation of the latent image recovery process, well beyond that provided by the prior art.

Charge Control

The present invention specifically anticipates the possibility that the positive and negative charge generators (0304, 0305) and their associated controls (0314, 0315) may be operated either manually or under computer control. Simple embodiments of the present invention may use knobs or other manual controls to adjust the charge applied to the platen and the developing wand as well as simple switches to activate/energize or deactivate/deenergize these charge generators. More sophisticated embodiments may utilize computer controls and adjustable timers to determine when charge is applied, the decay periods, and the amount of charge applied to both the platen and the developing wand.

The present invention specifically anticipates scenarios in which the developing wand is motorized and automatically moves across the platen surface at a fixed or adjustable distance from the insulating film covering the latent image document. Additionally, the application of imaging toner may also be automated in some embodiments. All of these scenarios may include the incorporation of computer controls to automate the recovery of latent images from the latent image document.

Static/Humidity Meters (2100)

The present invention may incorporate within the context of the system unit a humidity/moisture meter (2101) which may be used to check for ambient and/or document humidity and/or moisture content as well as a static meter (2102) to test for uniform positive and/or negative charge distribution on the insulating film used to cover the latent image document and recover the latent image from the underlying test document. One skilled in the art will recognize that a wide variety of meters may be used to implement these functions, some preferred embodiments utilizing the specific meters mentioned elsewhere in this document.

Process Overview (0500,0600,0700,0800,0900,1000,1100,1200,1300)

The present invention may incorporate a process for retrieval of latent document images which is generally illustrated in FIGS. 5-13 (0500, 0600, 0700, 0800, 0900, 1000, 1100, 1200, 1300). These process steps are generally as follows:

Placing the document on the conductive platen (0500, 0700), covering it with an insulating protective film (0800), mating the document and the insulating protective film (0900), and activating the platen vacuum (0600). Subsequent to this, the plate platen is positively charged to permit a background charge to be applied to the document surface. This charge is then allowed to bleed off for a period of time.

A document wand is connected to a negative charge and swiped (0600, 1000) over the surface of the document to be tested. This places charge on the insulating film over the document surface in preparation for extraction of the latent image.

An imaging powder is placed on the insulating film over the document surface to reveal the latent document image (1100). This retrieved latent image is then fixed to the insulating film via the use of adhesive spray or other insulating film fixation means (1200).

The insulating film is removed from the document platen and contains a fixated image retrieved from the underlying document (1300).

One skilled in the art will recognize that these steps may in some circumstances be rearranged with no loss of function with respect to application in the field of latent image document recovery.

Exemplary Method Embodiment (2200)

Figure 22:
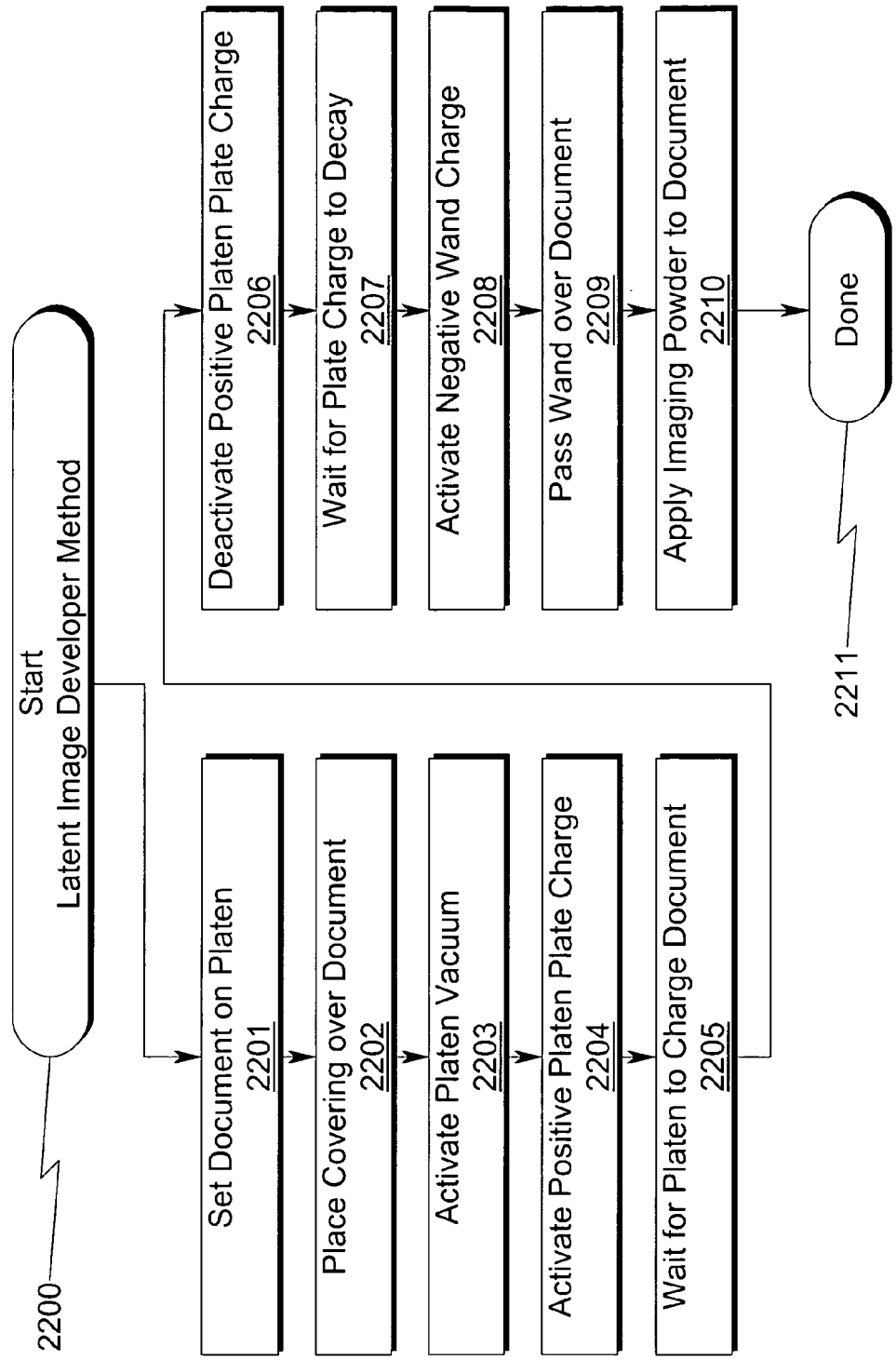
FIG. 22 illustrates an exemplary method embodiment of the present invention as applied to latent image recovery from documents.

The present invention may implement an exemplary method as illustrated by the exemplary flowchart in FIG. 22 (2200). This method as applied to the recovery of latent images typically involves the following steps:

Setting the document on the platen (2201);
Placing MYLAR® brand polyester film, polyvinyl, or another insulating protective covering material over the document (2202);
Activating the platen vacuum (2203);
Activating a positive plate charge to charge the platen surface and the document (2204);
Waiting for the platen plate to charge the document surface (2205);
Deactivating the positive platen plate charge (2206);
Waiting for the platen plate charge to decay (2207) (this typically takes approximately 15 seconds, but may vary with the document and ambient conditions);
Activating the negative wand charge (2208);
Passing the wand over the document (2209) (a distance to the document of approximately 6 inches is typical, but may vary with document and ambient conditions);
Applying image powder to the document to retrieve the latent document image (2210). This typically involves brushing copy toner or some other imaging powder over the document, typically using quick up and down strokes.
Optionally fixing the developed image via the use of an adhesive or other insulating film fixation means, which may be in the form of an aerosol or other fixing agent.

One skilled in the art will recognize that these steps may in some circumstances be rearranged, modified, expanded, or limited with no loss of function with respect to application in the field of latent image document recovery.

Humidification Method Embodiment (2300)

Figure 23:
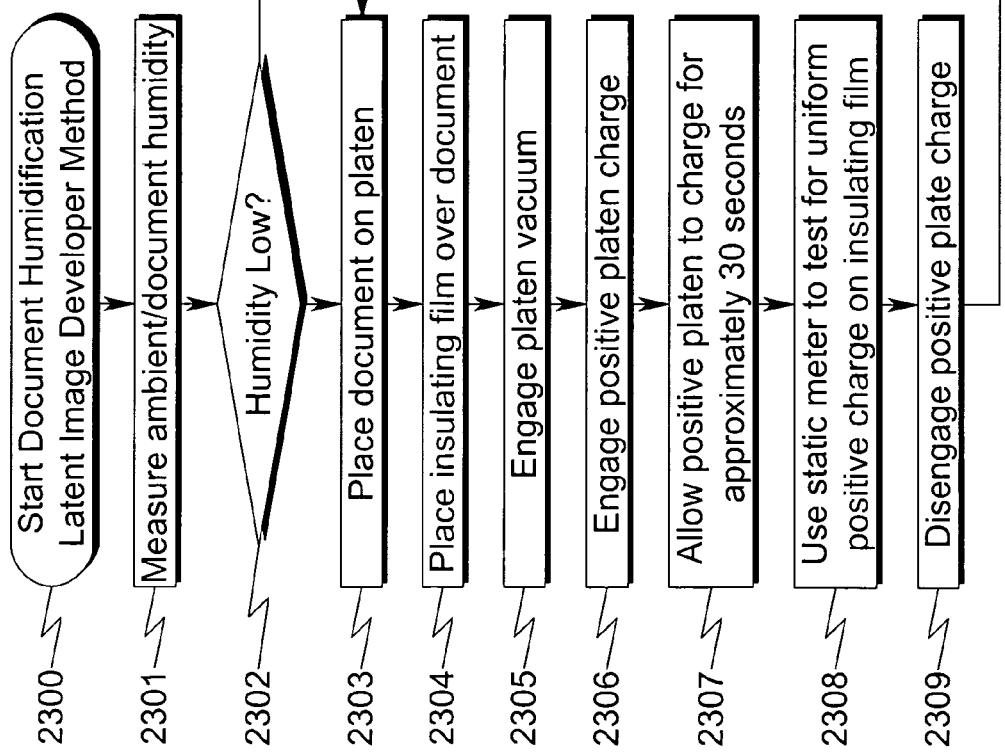
FIG. 23 illustrates an alternate exemplary method embodiment of the present invention as applied to latent image recovery from documents using document humidification.
Figure 24:
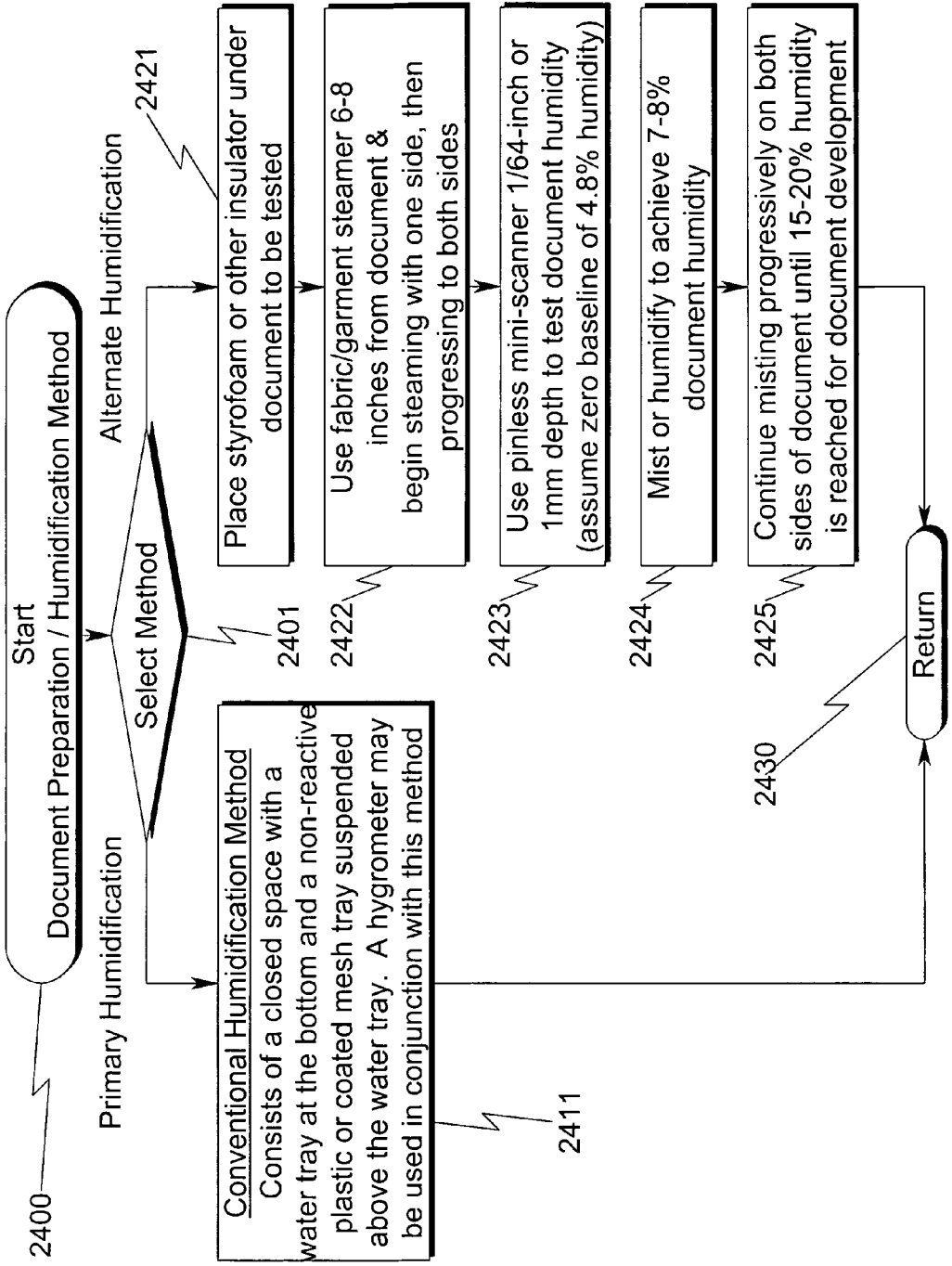
FIG. 24 illustrates an exemplary method embodiment of a document preparation/humidification procedure which may be useful in some preferred embodiments of the present invention.

The present invention may implement an exemplary method incorporating optional document humidification as illustrated by the exemplary flowchart in FIG. 23 (2300). This method may have advantages in some circumstances in which the document has moisture content insufficient to develop a clear latent image. This method as applied to the recovery of latent images typically involves the following steps:

Assessing the ambient room humidity and the document humidity and noting the amount of time the document has been exposed to the ambient room humidity (2301) to determine if the document should be humidified. This will determine if humidification of the document is required, and if so, to what degree. If the room humidity is low (typically less than 40%), it may be advantageous to humidify the document for a short duration by applying steam mist to one side or by placing the document in a humidification chamber for several minutes.
If document humidification is required, preparing/humidifying the document according to one of several protocols (2322).
Placing the document to be tested on the platen (2303).
Placing an insulating film (such as MYLAR® brand polyester film) smoothly over the document (2304).
Engaging the platen vacuum (2305), which will secure the document to the platen face. Further smoothing of the document surface may be accomplished via use of a cotton cloth on the insulating film.
Engaging the positive plate charge on the platen (2306).
Allow the positive platen to charge for approximately 30 seconds (2307).
Using a static meter to test for uniform positive charge on the insulating film during platen charging (2308).
Disengage the positive plate charge (2309).
Allow the document positive charge time to decay (2310). This may take approximately 15 seconds.

Engage the negative wand (2311). The charging of the negative wand may also occur during the positive charge decay phase.

Pass the wand over the insulating film covering the document (2312). This is optimally performed by passing the wand over the document slowly in multiple directions for 1 minute starting at approximately 6 inches above the document.

Using a static meter to test for uniform negative charge on the insulating film during platen charging (2313).

Apply/brush imaging powder to the document to develop the latent image on the insulating film (2314). This is optimally achieved by brushing the imaging powder over the document in quick up and down strokes and observing the resulting developed image. It has been observed that up-and-down or gentle "filling" of the indentations carefully tends to produce better results than circular motions. It is recommended that a minimal amount of imaging powder be used in initial image development.

If the latent image is insufficiently developed, make adjustments to charge time, decay time, document humidity, platen voltage, and/or wand voltage and repeat process (2315).

Optionally fix the developed image to the insulating film with an adhesive spray or other fixing means.

The timeframe for best image development results may be less than three minutes. However, the process can be revisited (especially parts of the document that are of lesser clarity) by wiping the insulating film with a clean cloth and restarting the image development process. This phase of the process is subject to certain variables, such as ambient room and document humidity, document thickness, depth of latent impressions, length and proximity of negative charge, as well as other aforementioned technique-specific elements. Care should be taken to note charging duration and intensity, as the negative charge can be manipulated quite easily with the present invention design.

Best results will typically be obtained by using the positive/negative charge controls in variable conditions and noting the outcome. The ability to modify the bias document charge, the decay time, and the negative charge spray, can greatly influence the latent document image recovery results.

Paper humidity is a critical aspect of the process. The use of a humidity meter will provide valuable information about the condition of the document paper and if humidification (and how much) is needed to obtain optimal image recovery results. The length and proximity of the negative charge will also affect the success of the image recovery as well. One skilled in the art will recognize that some trial and effort may be necessary to obtain optimal image recovery results when using the disclosed image recovery process.

One skilled in the art will recognize that these steps may in some circumstances be rearranged, modified, expanded, or limited with no loss of function with respect to application in the field of latent image document recovery.

Application to Counter-Terrorism

The present invention has particular application in the recovery of written impressions and/or fingerprints which may be associated with bombs and other explosives which terrorists used to commit violent acts against civilian populations in the United States and elsewhere. Additionally, the present invention has particular application to investigation of other criminal acts linked to terrorism, such as counterfeiting of United States currency.

In many circumstances investigation of terrorist cells involves the inspection of documents seized during the execution of search warrants. The present invention permits development of written impressions from these documents as well as the recovery of fingerprints from these documents to a level not previously known in the art.

Additionally, in many circumstances law enforcement must use forensic techniques to recover written impressions and/or fingerprint impressions from fragments of bombs or other explosives which have either detonated or which have been detected and disarmed.

The present invention drastically improves the potential for recovery of faint impressions and/or fingerprints from these items and as such presents an important tool which may be used by law enforcement to identify and apprehend individual terrorists responsible for planning and executing hostile acts against civilian populations. This forensic tool may also be used by law enforcement to recover information regarding planned terrorist acts by close inspection of documents seized from terrorists as a result of search warrant executions.

Finally, with respect to countering efforts to counterfeit United States currency, it is well known that a variety of terrorist organizations fund their efforts with counterfeit United States currency. These counterfeiting efforts by terrorists are also used to undermine the strength and credibility of United States currency, and as such affect a secondary harm to the United States by these terrorist organizations. These efforts can be thwarted in part by identification of the individuals responsible for generating the counterfeits, as well as recovery of latent tooling impressions associated with presses and the like that are used to generated these bogus bills. The present invention represents a significant improvement in technology used to affect this latent image recovery, and thus is highly applicable to thwarting of terrorist activities.

CONCLUSION

A latent image developer system and method has been disclosed permitting the recovery of document impressions present in paper and other materials. The disclosed system utilizes two power supplies, a first power supply providing a plate bias charge which is applied to the document to be inspected, and a secondary power supply utilized to attract toner or other imaging powder attractant to the latent images present on the document to be inspected. The disclosed invention permits recovery of previously unrecoverable latent detail within documents as compared to the prior art which utilized a single power supply to promote toner to be attracted to the latent document images. The disclosed invention may be used by law enforcement to identify individual responsible for manufacturing and exploding bombs and the like and as such is useful in countering terrorism.

What is claimed is:

1. A latent image developer system comprising:
(a) document platen;
(b) vacuum container supporting said document platen;
(c) vacuum generator;
(d) positive platen plate charge generator;
(e) negative charge generator;
(f) developing wand;
wherein
said document platen is porous, permitting adhesion of a latent image document to the surface of said document platen when a vacuum is applied to the opposite side of said document platen;

said document platen mates to said vacuum container to form an airtight interface;

said vacuum generator produces a vacuum within said vacuum container;

said positive platen charge generator permits application of a positive charge to said document platen and said latent image document when placed thereon;

said negative charge generator permits application of a negative charge via said developing wand to said an insulating film placed upon said latent image document when said document is placed on the outer surface of said document platen;

said negative charge applied to said insulating film permits attraction of an imaging powder to reveal latent images in said latent image document.

2. The latent image developer system of claim 1 further comprising a humidity meter to test the moisture content of said latent image document.

3. The latent image developer system of claim 1 further comprising a static meter to test for uniform positive and negative charge on said insulating film.

4. The latent image developer system of claim 1 wherein said positive platen charge is generated by a variable voltage power supply.

5. The latent image developer system of claim 1 wherein said negative charge is generated by a variable voltage power supply.

6. The latent image developer system of claim 1 wherein said positive platen charge generator and said negative charge generator are under computer control.

7. A latent image developer method comprising:
(a) Setting a document on a document platen;
(b) Placing an insulating film over said document;
(c) Activating a vacuum on said platen;
(d) Activating a positive platen plate charge to charge the surface of said platen and said document;
(e) Waiting for said platen plate to charge said document surface;
(f) Deactivating said positive platen plate charge;
(g) Waiting for said platen plate charge to decay;
(h) Activating a negative charge on a developing wand;
(i) Passing said developing wand over said insulating film covering said document;
(j) Applying imaging powder to said insulating film to retrieve a latent image present on said document;
wherein
said positive platen charge biases said document surface and permits said negative charge from said developing wand to affix said imaging powder to said latent image present on said insulating film.

8. The latent image developer method of claim 7 further comprising the step of applying an adhesive to said insulating film to fix said latent image on said insulating film.

9. The latent image developer method of claim 7 wherein said platen comprises sintered aluminum.

10. The latent image developer method of claim 7 wherein said positive platen charge is generated by a variable voltage power supply.

11. The latent image developer method of claim 7 wherein said negative charge is generated by a variable voltage power supply.

12. The latent image developer method of claim 7 wherein said imaging powder comprises xerographic copier toner.

13. A latent image developer method comprising:
(1) Measuring ambient/document humidity;
(2) If ambient or document humidity is low, then humidifying the document to be developed, otherwise proceeding to step (3);
(3) Placing said document on a document platen;
(4) Covering said document with an insulating film;
(5) Engaging a vacuum on said platen;
(6) Engaging a positive platen plate charge to charge the surface of said platen and said document;
(7) Waiting for said platen plate to charge said document surface;
(8) Using a static meter to test for uniform positive charge on said insulating film;
(9) Disengaging said positive platen plate charge;
(10) Waiting for said platen plate charge to decay;
(11) Engaging a negative charge on a developing wand;
(12) Passing said developing wand over said insulating film;
(13) Using said static meter to test for uniform negative charge on said insulating film;
(14) Applying imaging powder to said insulating film to retrieve the latent image present on said document beneath said insulating film;
wherein
said positive platen charge biases said document surface and permits said negative charge from said developing wand to affix said image powder to said latent image present on said insulating film surface.

14. The latent image developer method of claim 13 further comprising the step of applying an adhesive to said insulating film to fix said latent image on said insulating film.

15. The latent image developer method of claim 13 wherein said platen comprises sintered aluminum.

16. The latent image developer method of claim 13 wherein said positive platen charge is generated by a variable voltage power supply.

17. The latent image developer method of claim 13 wherein said negative charge is generated by a variable voltage power supply.

18. The latent image developer method of claim 13 wherein said imaging powder comprises xerographic copier toner.

19. The latent image developer method of claim 13 wherein said document humidification further comprises using a closed space with a water tray at the bottom and a non-reactive plastic or coated mesh tray suspended above said water tray on which said document is placed to absorb moisture as measured by a hygrometer.

20. The latent image developer method of claim 13 wherein said document humidification further comprises placing an insulator under said document and using a steam mister to inject moisture into said document, with inspection of said document humidity with a moisture meter, humidification to achieve 7-8% humidity in said document, and progressive humidification of both sides of said document to achieve an overall 15-20% humidity in said document.

* * * * *